(12) United States Patent
Wu et al.

(10) Patent No.: US 11,343,808 B2
(45) Date of Patent: May 24, 2022

(54) UPLINK DATA SENDING METHOD AND APPARATUS

(71) Applicant: HUAWEI TECHNOLOGIES CO., LTD., Guangdong (CN)

(72) Inventors: Zuomin Wu, Shenzhen (CN); Lei Guan, Beijing (CN); Sha Ma, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 143 days.

(21) Appl. No.: 16/672,847

(22) Filed: Nov. 4, 2019

(65) Prior Publication Data
US 2020/0068562 A1    Feb. 27, 2020

Related U.S. Application Data

(63) Continuation of application No. PCT/CN2017/083361, filed on May 5, 2017.

(51) Int. Cl.
*H04W 72/04* (2009.01)
*H04L 1/00* (2006.01)
(Continued)

(52) U.S. Cl.
CPC ....... *H04W 72/0413* (2013.01); *H04L 1/0068* (2013.01); *H04W 16/14* (2013.01); *H04W 72/0446* (2013.01); *H04W 72/1273* (2013.01)

(58) Field of Classification Search
CPC ............. H04W 72/0413; H04W 16/14; H04W 72/0446; H04W 72/1273; H04L 1/0068;
(Continued)

(56) References Cited

U.S. PATENT DOCUMENTS

| 2015/0288483 A1 | 10/2015 | Sun et al. |
| 2016/0278048 A1* | 9/2016 | Nory .............. H04L 1/1887 |

(Continued)

FOREIGN PATENT DOCUMENTS

| CN | 104980247 A | 10/2015 |
| CN | 105162562 A | 12/2015 |

(Continued)

OTHER PUBLICATIONS

R1-165293 Ericsson."sPDCCH search space design",3GPP TSG-RAN WG1 #85,Nanjing, PR. China, May 23-27, 2016,total 6 pages.

(Continued)

*Primary Examiner* — Gary Mui
*Assistant Examiner* — Chuong M Nguyen
(74) *Attorney, Agent, or Firm* — Womble Bond Dickinson (Us) LLP

(57) ABSTRACT

A terminal device receives first scheduling information from an access network device, where the first scheduling information is used to schedule the terminal device to transmit a first transport block by using an unlicensed carrier; performs rate matching on the first transport block, to obtain uplink data; detects the unlicensed carrier, and determines a start time domain symbol, used to send the uplink data, in at least two time domain symbols included in a first subframe, where the at least two time domain symbols include a first time domain symbol and a second time domain symbol, the second time domain symbol is later than the first time domain symbol, and the start time domain symbol is the first time domain symbol or the second time domain symbol; and sends the uplink data to the access network device from the start time domain symbol.

20 Claims, 8 Drawing Sheets

600

| An access network device sends first scheduling information to a terminal device, where the first scheduling information is used to schedule the terminal device to transmit a first transport block by using an unlicensed carrier | — S610 |

| The access network device receives, from the terminal device, uplink data corresponding to the first transport block from a start time domain symbol, where the start time domain symbol is a first time domain symbol or a second time domain symbol in at least two time domain symbols included in a first time unit, the second time domain symbol is later than the first time domain symbol, and the at least two time domain symbols are used to receive the uplink data | — S620 |

(51) Int. Cl.
*H04W 16/14* (2009.01)
*H04W 72/12* (2009.01)

(58) Field of Classification Search
CPC ... H04L 5/0064; H04L 5/0007; H04L 5/0094; H04L 5/0083
See application file for complete search history.

(56) References Cited

U.S. PATENT DOCUMENTS

| | | | |
|---|---|---|---|
| 2018/0069653 A1 | 3/2018 | Fujishiro et al. | |
| 2018/0167960 A1 | 6/2018 | Zhang et al. | |
| 2018/0192442 A1 | 7/2018 | Li et al. | |
| 2018/0241499 A1* | 8/2018 | Einhaus | H04L 27/0006 |
| 2019/0260500 A1 | 8/2019 | Fujishiro et al. | |

FOREIGN PATENT DOCUMENTS

| | | |
|---|---|---|
| CN | 105162563 A | 12/2015 |
| CN | 105592468 A | 5/2016 |
| CN | 105611637 A | 5/2016 |
| CN | 106301733 A | 1/2017 |
| EP | 3013109 A1 | 4/2016 |
| EP | 3016312 A2 | 5/2016 |
| EP | 3131225 A1 | 2/2017 |
| RU | 2409896 C2 | 1/2011 |
| WO | 2007124710 A1 | 11/2007 |
| WO | 2014021765 A2 | 2/2014 |
| WO | 2016030299 A1 | 3/2016 |
| WO | 2016185945 A1 | 11/2016 |
| WO | 2017024962 A1 | 2/2017 |

OTHER PUBLICATIONS

3GPP TSG RAN WG1 Meeting #87,R1-1611248:"Forward compatibility considerations on NR operations of the unlicensed band",Huawei, HiSilicon,Reno, Nevada, Nov. 14-18, 2016,total 4 pages.

* cited by examiner

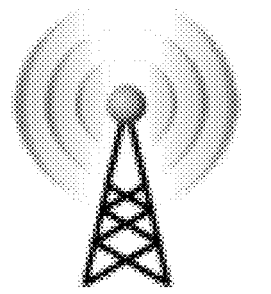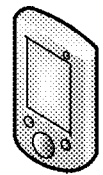
Access network device 110          Terminal device 120
FIG. 1

600

| An access network device sends first scheduling information to a terminal device, where the first scheduling information is used to schedule the terminal device to transmit a first transport block by using an unlicensed carrier | — S610 |

| The access network device receives, from the terminal device, uplink data corresponding to the first transport block from a start time domain symbol, where the start time domain symbol is a first time domain symbol or a second time domain symbol in at least two time domain symbols included in a first time unit, the second time domain symbol is later than the first time domain symbol, and the at least two time domain symbols are used to receive the uplink data | — S620 |

FIG. 6

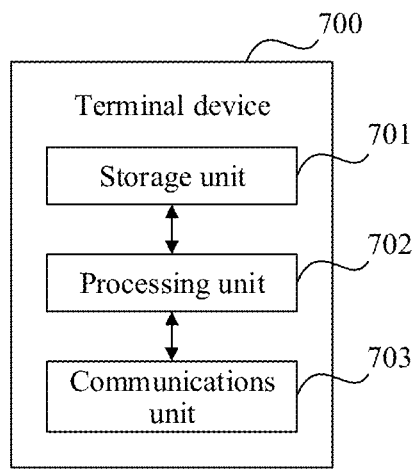

FIG. 7

UPLINK DATA SENDING METHOD AND APPARATUS

CROSS-REFERENCE TO RELATED APPLICATIONS

This application is a continuation of International Application No. PCT/CN2017/083361, filed on May 5, 2017, which is hereby incorporated by reference in its entirety.

TECHNICAL FIELD

This application relates to the communications field, and in particular, to an uplink data sending method and apparatus and an uplink data receiving method and apparatus in the wireless communications field.

BACKGROUND

In the current wireless communications field, spectrum resources are classified into two types: a licensed spectrum resource and an unlicensed spectrum resource. The licensed spectrum resource is a spectrum resource that is designated by a radio regulation committee of a government for a special purpose, for example, a spectrum resource that is exclusively used by a mobile operator, or a spectrum resource that is exclusively used in civil aviation, railway, and police. Due to policy exclusiveness, service quality of the licensed spectrum resource can be usually ensured, and scheduling control can be relatively easily performed.

The unlicensed spectrum resource is also a spectrum resource that is designated by the government, but a ratio technology, an operator, and a service life are not limited, and service quality of such a frequency band is not ensured. A communications device can use the unlicensed spectrum resource for free as long as the communications device meets a requirement on an index such as transmit power or out-of-band leakage. Common communications systems that use the unlicensed spectrum resource for communication include a civil walkie-talkie, a wireless fidelity (Wi-Fi) system, a Bluetooth communications system, and the like.

In an existing wireless communications system, a spectrum resource used by an operator is mainly the licensed spectrum resource. As a quantity of users of a mobile communications network increases, and requirements of the users on a communication rate and service quality are improved, it is difficult to meet a requirement of an existing service of the operator by using the existing licensed spectrum resource. In consideration that a new licensed spectrum is expensive and rare, operators begin to focus on the unlicensed spectrum resource, and expect to use the unlicensed spectrum resource to offload network capacity and improve service quality.

For example, in an unlicensed long term evolution (U-LTE) system, there are two communication modes using the unlicensed spectrum. In the first mode, transmission on a carrier in an unlicensed spectrum is assisted by a carrier in a licensed spectrum. For example, the system is a licensed-assisted access using long term evolution (LAA-LTE) system and an evolved system thereof. In the second mode, transmission on a carrier in an unlicensed spectrum is not assisted by a carrier in a licensed spectrum. For example, the system is a stand-alone long term evolution (SA-LTE) system and an evolved system thereof.

However, utilization efficiency of the unlicensed spectrum of the foregoing communications systems is still relatively low.

SUMMARY

In view of this, the present disclosure provides an uplink data sending method and apparatus and an uplink data receiving method and apparatus, to improve spectrum utilization for sending and receiving uplink data by using an unlicensed spectrum.

According to a first aspect, an uplink data sending method is provided. The method includes: receiving, by a terminal device, first scheduling information from an access network device, where the first scheduling information is used to schedule the terminal device to transmit a first transport block by using an unlicensed carrier; performing, by the terminal device, rate matching on the first transport block, to obtain uplink data; detecting, by the terminal device, the unlicensed carrier, and determining, based on a detection result, a start time domain symbol, used to send the uplink data, in at least two time domain symbols included in a first subframe, where the at least two time domain symbols include a first time domain symbol and a second time domain symbol, the second time domain symbol is later than the first time domain symbol, and the start time domain symbol is the first time domain symbol or the second time domain symbol; and sending, by the terminal device, the uplink data to the access network device from the start time domain symbol.

According to the uplink data sending method provided in the present disclosure, the terminal device determines a time domain symbol, used to transmit the uplink data, in at least two time domain symbols included in a subframe. When a previous time domain symbol cannot be used, the terminal device may detect whether a latter time domain symbol can be used, thereby increasing a probability of successful transmission in a time unit and improving utilization of an unlicensed spectrum during uplink data transmission.

In some examples, when the start time domain symbol is the first time domain symbol, the uplink data is first uplink data obtained by performing rate matching on the first transport block from the first time domain symbol; or when the start time domain symbol is the second time domain symbol, the uplink data is second uplink data obtained by performing rate matching on the first transport block from the second time domain symbol, where the second uplink data is remaining data in first uplink data after data between the first time domain symbol and the second time domain symbol is removed.

When the previous time domain symbol in the at least two time domain symbols cannot be used to transmit the uplink data and the latter time domain symbol can be used to transmit the uplink data, the terminal device may perform puncture transmission on data mapped on an entire subframe. To be specific, data before the latter time domain symbol is discarded and some data is transmitted only from the latter time domain symbol. Therefore, complexity of sending uplink data by the terminal device is reduced and load of a processor of the terminal device is alleviated.

In some examples, the performing, by the terminal device, rate matching on the first transport block, to obtain uplink data includes:

performing, by the terminal device, rate matching on the first transport block from the first time domain symbol, to obtain the first uplink data; and the sending, by the terminal device, the uplink data to the access network device from the start time domain symbol includes:

sending, by the terminal device, the second uplink data to the access network device from the second time domain symbol, where the second uplink data is remaining data in first uplink data after data between the first time domain symbol and the second time domain symbol is removed.

When the previous time domain symbol in the at least two time domain symbols cannot be used to transmit the uplink data and the latter time domain symbol can be used to transmit the uplink data, the terminal device may perform puncture transmission on data mapped on an entire subframe. To be specific, data before the latter time domain symbol is discarded and some data is transmitted only from the latter time domain symbol. Therefore, complexity of sending uplink data by the terminal device is reduced and load of a processor of the terminal device is alleviated.

In some examples, before the performing, by the terminal device, rate matching on the first transport block, the method further includes: receiving, by the terminal device, first indication information from the access network device, where the first indication information is used to indicate a first transmission mode or a second transmission mode, the first transmission mode is sending the uplink data from the first time domain symbol or the second time domain symbol, and the second transmission mode is sending the uplink data from the first time domain symbol and skipping sending the uplink data from the second time domain symbol.

The access network device may indicate a transmission mode of the terminal device, so that the transmission mode can be flexibly selected based on an actual situation.

In some examples, the performing, by the terminal device, rate matching on the first transport block includes: determining, by the terminal device, a first modulation order in an MCS configuration set based on a first modulation and coding scheme (MCS) index; and performing, by the terminal device, rate matching on the first transport block based on the first modulation order, where when the first indication information indicates the first transmission mode, the MCS configuration set is a first MCS configuration set; or when the first indication information indicates the second transmission mode, the MCS configuration set is a second MCS configuration set, where the first MCS configuration set is different from the second MCS configuration set.

When the start time domain symbol used to send the uplink data is different, a resource for transmitting the uplink data may also be different. In a subframe, a different MCS configuration set is selected based on a different transmission mode, so that a proper bit rate may be determined based on an actual situation, thereby improving flexibility and reliability of uplink data transmission.

In some examples, the performing, by the terminal device, rate matching on the first transport block includes: determining, by the terminal device, a first modulation order in a first MCS configuration set based on a first MCS index, and performing rate matching on the first transport block based on the first modulation order.

In some examples, the method further includes: determining, by the terminal device, a second modulation order in a second MCS configuration set, and performing rate matching on a second transport block based on the second modulation order, where the second transport block is transmitted by using a second subframe, and a modulation order of the first transport block is the first modulation order included in the first MCS configuration set.

A start time domain symbol used to send the uplink data in a different subframe may be different. Therefore, a bit rate at which the terminal device sends the uplink data by using the different subframe may also be different. A different MCS configuration set is selected for the different subframe, so that a proper bit rate may be determined based on an actual situation, thereby improving flexibility and reliability of uplink data transmission.

In some examples, that the first MCS configuration set is different from the second MCS configuration set includes: a modulation order, corresponding to the first MCS index, in the first MCS configuration set is greater than or equal to a modulation order, corresponding to the first MCS index, in the second MCS configuration set.

For a same MCS index, a modulation order, corresponding to the MCS index, in the first MCS configuration set is greater than or equal to a modulation order, corresponding to the MCS index, in the second MCS configuration set. In the foregoing embodiment, when the uplink data is sent by using the first transmission mode or the first subframe, it is possible that the uplink data is sent from the second time domain symbol in the first subframe, and a larger modulation order in the first MCS configuration set may be used. Therefore, a bit rate may be reduced, and a probability of successful decoding of the access network device is increased.

In some examples, a first bit rate of a third transport block corresponding to a third modulation order in the first MCS configuration set is less than a preset value, the first bit rate is a bit rate of uplink data that is transmitted from the second time domain symbol and that corresponds to the third transport block, and the third modulation order is a modulation order other than a highest modulation order in the first MCS configuration set.

The preset value may be set based on a decoding capacity of the access network device and a current communication environment. When a bit rate of a transport block is greater than the preset value, a modulation order is increased and the bit rate is reduced, so that a probability of successful decoding of the access network device may be increased.

In some examples, the method further includes: receiving, by the terminal device, second indication information from the access network device, where the second indication information is used to indicate the first MCS configuration set or the second MCS configuration set.

The access network device may schedule, by using the second indication information, an MCS configuration set used by the terminal device in a subframe or a start time domain symbol, thereby increasing flexibility of uplink transmission.

In some examples, the method further includes: sending, by the terminal device, third indication information to the access network device, where the third indication information is used to indicate the start time domain symbol.

Therefore, the access network device may obtain the start time domain symbol determined by the terminal device.

According to another aspect, an uplink data receiving method is provided. The method includes: sending, by an access network device, first scheduling information to a terminal device, where the first scheduling information is used to schedule the terminal device to transmit a first transport block by using an unlicensed carrier; receiving, by the access network device from the terminal device, uplink data corresponding to the first transport block from a start time domain symbol, where the start time domain symbol is a first time domain symbol or a second time domain symbol in at least two time domain symbols included in a first subframe, the second time domain symbol is later than the first time domain symbol, and the at least two time domain symbols are used to receive the uplink data.

According to the uplink data receiving method provided in the present disclosure, the access network device determines a time domain symbol, used to receive the uplink data, in at least two time domain symbols included in a subframe. When the uplink data is not detected on a previous time domain symbol, the access network device may detect whether the uplink data exists on a latter time domain symbol, thereby increasing a probability of successful transmission in a time unit and improving utilization of an unlicensed spectrum during uplink data transmission.

In some examples, the receiving, by the access network device from the terminal device, uplink data corresponding to the first transport block from a start time domain symbol includes: determining, by the access network device, the start time domain symbol as the first time domain symbol or the second time domain symbol based on a detected quantity or detected locations of reference signal symbols included in the first subframe; and receiving, by the access network device based on the determined start time domain symbol, the uplink data corresponding to the first transport block from the terminal device.

In some examples, when the start time domain symbol is the first time domain symbol, the uplink data corresponding to the first transport block is first uplink data obtained by performing rate matching on the first transport block from the first time domain symbol; or when the start time domain symbol is the second time domain symbol, the uplink data corresponding to the first transport block is second uplink data obtained by performing rate matching on the first transport block from the second time domain symbol, where the second uplink data is remaining data in first uplink data after data between the first time domain symbol and the second time domain symbol is removed.

When the previous time domain symbol in the at least two time domain symbols cannot be used to transmit the uplink data and the latter time domain symbol can be used to transmit the uplink data, the terminal device may perform puncture transmission on data mapped on an entire subframe. To be specific, data before the latter time domain symbol is discarded and some data is transmitted only from the latter time domain symbol. Therefore, complexity of sending uplink data by the terminal device is reduced and load of a processor of the terminal device is alleviated.

In some examples, before the receiving, by the access network device from the terminal device, uplink data corresponding to the first transport block from a start time domain symbol, the method further includes: sending, by the access network device, first indication information to the terminal device, where the first indication information is used to indicate a first transmission mode or a second transmission mode, the first transmission mode is sending the uplink data corresponding to the first transport block from the first time domain symbol or the second time domain symbol, and the second transmission mode is sending the uplink data from the first time domain symbol and skipping sending the uplink data corresponding to the first transport block from the second time domain symbol.

The access network device may indicate a transmission mode of the terminal device, so that the transmission mode can be flexibly selected based on an actual situation.

In some examples, the first scheduling information is used to indicate a first modulation and coding scheme (MCS) index, and when the first indication information indicates the first transmission mode, a modulation order of the uplink data corresponding to the first transport block is a first modulation order determined based on the first MCS index and a first MCS configuration set; or when the first indication information indicates the second transmission mode, a modulation order of the uplink data corresponding to the first transport block is a second modulation order determined based on the first MCS index and a second MCS configuration set, where the first MCS configuration set is different from the second MCS configuration set.

When the start time domain symbol used to send the uplink data is different, a bit rate of the uplink data may also be different. In a subframe, a different MCS configuration set is selected based on a different transmission mode, so that a proper bit rate may be determined based on an actual situation, thereby improving flexibility and reliability of uplink data transmission.

In some examples, the first scheduling information is used to indicate a first MCS index, so that the terminal device determines, based on the first MCS index, a first modulation order, of the uplink data corresponding to the first transport block, in a first MCS configuration set.

In some examples, the method further includes:

sending, by the access network device, second scheduling information to the terminal device, where the second scheduling information is used to indicate a second MCS index, so that the terminal device determines, based on the second MCS index, a second modulation order, of uplink data corresponding to a second transport block, in a second MCS configuration set, the second transport block is transmitted by using a second subframe, and the first MCS configuration set is different from the second MCS configuration set.

A start time domain symbol used to send the uplink data in a different subframe may be different. Therefore, a bit rate at which the terminal device sends the uplink data by using the different subframe may also be different. A different MCS configuration set is selected for the different subframe, so that a proper bit rate may be determined based on an actual situation, thereby improving flexibility and reliability of uplink data transmission.

In some examples, that the first MCS configuration set is different from the second MCS configuration set includes: a modulation order, corresponding to the first MCS index, in the first MCS configuration set is greater than or equal to a modulation order, corresponding to the first MCS index, in the second MCS configuration set.

For a same MCS index, a modulation order, corresponding to the MCS index, in the first MCS configuration set is greater than or equal to a modulation order, corresponding to the MCS index, in the second MCS configuration set. In the foregoing embodiment, when the uplink data is sent by using the first transmission mode or the first subframe, it is possible that the uplink data is sent from the second time domain symbol in the first subframe, and a larger modulation order in the first MCS configuration set may be used. Therefore, a bit rate can be reduced, and a probability of successful decoding of the access network device is increased.

In some examples, a first bit rate of a third transport block corresponding to a third modulation order in the first MCS configuration set is less than a preset value, the first bit rate is a bit rate of uplink data that is transmitted from the second time domain symbol and that corresponds to the third transport block, and the third modulation order is a modulation order other than a highest modulation order in the first MCS configuration set.

The preset value may be set based on a decoding capacity of the access network device and a current communication environment. When a bit rate of a transport block is greater than the preset value, a modulation order is increased and the bit rate is reduced, so that a probability of successful decoding of the access network device may be increased.

In some examples, the method further includes: sending, by the access network device, second indication information to the terminal device, where the second indication information is used to indicate the first MCS configuration set or the second MCS configuration set.

The access network device may schedule, by using the second indication information, an MCS configuration set used by the terminal device in a subframe or a start time domain symbol, thereby increasing flexibility of uplink transmission.

In some examples, the method further includes: receiving, by the access network device, third indication information from the terminal device, where the third indication information is used to indicate the start time domain symbol.

Therefore, the access network device may obtain the start time domain symbol determined by the terminal device.

According to still another aspect, the present disclosure provides an uplink data sending apparatus. The apparatus can implement functions performed by the terminal device in the methods in the foregoing aspects, and the functions may be implemented by using hardware, or may be implemented by hardware executing corresponding software. The hardware or the software includes one or more units or modules corresponding to the foregoing functions.

In a possible design, a structure of the apparatus includes a processor and a transceiver. The processor is configured to support the apparatus in performing corresponding functions in the foregoing methods. The transceiver is configured to support communication between the apparatus and another network element. The apparatus may further include a memory. The memory is configured to couple to the processor, and stores a program instruction and data that are required by the apparatus.

According to still another aspect, the present disclosure provides an uplink data receiving apparatus. The apparatus can implement functions performed by the access network device in the methods in the foregoing aspects, and the functions may be implemented by using hardware, or may be implemented by hardware executing corresponding software. The hardware or the software includes one or more units or modules corresponding to the foregoing functions.

In a possible design, a structure of the apparatus includes a processor and a transceiver. The processor is configured to support the apparatus in performing corresponding functions in the foregoing methods. The transceiver is configured to support communication between the apparatus and another network element. The apparatus may further include a memory. The memory is configured to couple to the processor, and stores a program instruction and data that are required by the apparatus.

According to still another aspect, a network system is provided. The network system includes the uplink data sending apparatus and the uplink data receiving apparatus according to the foregoing aspects.

According to still another aspect, a computer program product is provided. The computer program product includes computer program code. When the computer program code is run by a communications unit and a processing unit or a transceiver and a processor of a terminal device, the terminal device is enabled to perform the method in the foregoing implementations.

According to still another aspect, a computer program product is provided. The computer program product includes computer program code. When the computer program code is run by a communications unit and a processing unit or a transceiver and a processor of an access network device, the access network device is enabled to perform the method in the foregoing implementations.

According to still another aspect, the present disclosure provides a computer storage medium, configured to store computer software instructions used by the foregoing terminal device. The computer software instructions include a program designed for performing the foregoing aspects.

According to still another aspect, the present disclosure provides a computer storage medium, configured to store computer software instructions used by the foregoing access network device. The computer software instructions include a program designed for performing the foregoing aspects.

According to still another aspect, the present disclosure provides a communications chip, storing instructions. When the instructions are run on a terminal device, the communications chip is enabled to perform the methods in the foregoing aspects.

According to still another aspect, the present disclosure provides a communications chip, storing instructions. When the instructions are run on a network device, the communications chip is enabled to perform the methods in the foregoing aspects.

BRIEF DESCRIPTION OF DRAWINGS

FIG. 1 is a schematic architectural diagram of a communications system applicable to the present disclosure;

FIG. 6 is a schematic diagram of an uplink data receiving method according to one embodiment of the present disclosure;

FIG. 7 is a schematic diagram of a possible terminal device according to one embodiment of the present disclosure;

DESCRIPTION OF EMBODIMENTS

Figure 2:
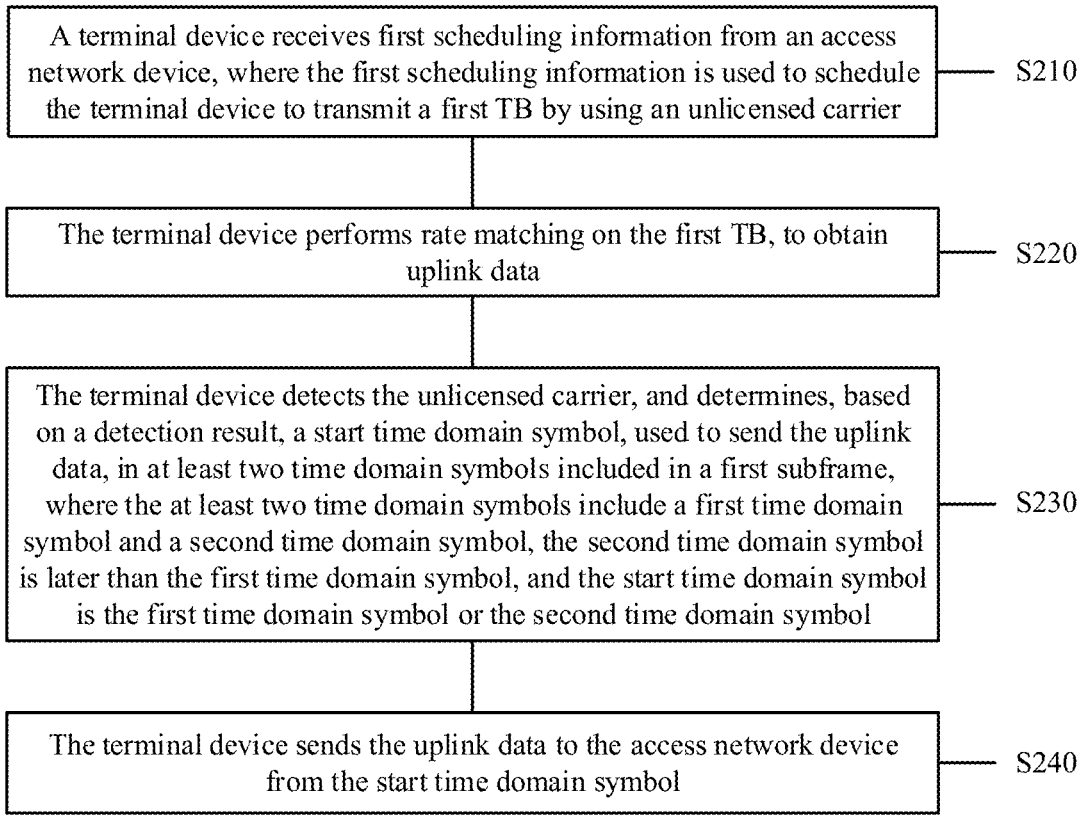
FIG. 2 is a schematic diagram of an uplink data sending method according to one embodiment of the present disclosure.

The following describes technical solutions of the present disclosure with reference to the accompanying drawings.

FIG. 1 shows a communications system 100 applicable to the present disclosure. The communications system 100 includes an access network device 110 and a terminal device 120. The access network device 110 communicates with the terminal device 120 through a radio network. When the terminal device 120 sends data, a wireless communications module may code information for transmission. Specifically, the wireless communications module may obtain a quantity of data bits that are to be sent to the access network device 110 through a channel. The data bits are, for example, data bits generated by a processing module, or received from another device, or stored in a storage module. The data bits may be included in one or more transport blocks (TB), and the TB may be segmented to produce a plurality of code blocks.

In the present disclosure, the terminal device may be referred to as an access terminal, user equipment (UE), a subscriber unit, a subscriber station, a mobile station, a remote station, a remote terminal, a mobile device, a user terminal, a terminal, a wireless communication device, a user agent, or a user apparatus. The access terminal may be a cellular phone, a handheld device with a wireless communication function, a computing device or another processing device connected to a wireless modem, a vehicle-mounted device, a wearable device, and user equipment in a 5G communications system.

The access network device may be a base transceiver station (BTS) in a code division multiple access (CDMA) system, a nodeB (NB) in a wideband code division multiple access (WCDMA) system, an evolved nodeB (eNB) in a long term evolution (LTE) system, or a gNB in a 5G communications system. The foregoing base stations are only examples. The access network device may alternatively be a relay station, an access point, a vehicle-mounted device, a wearable device, or another type of device.

The communications system applicable to the present disclosure is merely an example for description, and the communications system applicable to the present disclosure is not limited thereto. For example, the communications system may include another quantity of access network devices and another quantity of terminal devices.

To facilitate understanding of the present disclosure, before an uplink data sending method provided in the present disclosure is described, concepts in the present disclosure are briefly described first.

A communications system using an unlicensed spectrum, for example, an LAA-LTE system, an SA-LTE system, another U-LTE system, or a 5G communications system, needs to comply with specifications defined for use of the unlicensed spectrum in various regions. For example, when devices of different systems or different devices of a same system coexist on the unlicensed spectrum, problems of resource competition between different devices need to be resolved. Therefore, it is defined by some countries or regions that a device using the unlicensed spectrum should follow a resource competition method of listen before talk (LBT). To be specific, the device can send a signal only when detecting that a channel is idle.

The terminal device first needs to detect whether the channel is idle on the unlicensed spectrum, and the device can transmit data only when determining that the channel is idle. Therefore, when scheduling information schedules the terminal device to perform uplink transmission in a time unit (for example, a subframe), the terminal device needs to detect whether the channel is available before the time unit.

For example, the terminal device may detect whether a frequency domain resource corresponding to the channel is in an idle state before the time unit, in other words, whether the frequency domain resource is used by another device.

If the frequency domain resource is in the idle state, in other words, the frequency domain resource is not used by another device, the terminal device may use the frequency domain resource for communication, for example, to perform uplink transmission.

If the frequency domain resource is not in the idle state, in other words, the frequency domain resource has already been used by another device, the terminal device cannot use the frequency domain resource.

It should be noted that in the embodiments of the present disclosure, a specific method and process for detecting the channel may be similar to the prior art. To avoid repetition, detailed descriptions are omitted herein.

To improve transmission efficiency on the unlicensed spectrum, after the terminal device determines, before the time unit through channel detection, that the channel is unavailable, the terminal device may continue to perform channel detection in the time unit. If the terminal device determines, before a time domain start point in the time unit through channel detection, that the channel is available, the terminal device may perform transmission from the time domain start point in the time unit.

By way of example rather than limitation, in the embodiments of the present disclosure, the unlicensed spectrum resource may include a band near 5 gigahertz (GHz), a band near 2.4 GHz, a band near 3.5 GHz, and a band near 60 GHz.

It should be understood that the time unit indicates a time unit in which a communications device performs data transmission. For example, a time unit may be a subframe or a transmission time interval (TTI). A length of a time unit may be 1 millisecond (ms), or may be less than 1 ms. This is not limited in the present disclosure. To facilitate understanding of the technical solutions of the present disclosure, the following describes the technical solutions provided in the present disclosure in detail by using an example in which a time unit is a subframe.

FIG. 2 is a schematic flowchart of an uplink data sending method according to one embodiment of the present disclosure. The method 200 includes the following operations.

Operation S210. A terminal device receives first scheduling information from an access network device, where the first scheduling information is used to schedule the terminal device to transmit a first TB by using an unlicensed carrier.

Operation S220. The terminal device performs rate matching on the first TB, to obtain uplink data.

Operation S230. The terminal device detects the unlicensed carrier, and determines, based on a detection result, a start time domain symbol, used to send the uplink data, in at least two time domain symbols included in a first subframe, where the at least two time domain symbols include a first time domain symbol and a second time domain symbol, the second time domain symbol is later than the first time domain symbol, and the start time domain symbol is the first time domain symbol or the second time domain symbol.

Operation S240. The terminal device sends the uplink data to the access network device from the start time domain symbol.

To facilitate understanding of the technical solutions of the present disclosure easier, the following describes the technical solutions provided in the present disclosure in detail by using an example in which the terminal device is UE and the access network device is a base station.

In S210, the first scheduling information is used to schedule the UE to transmit the first TB by using the unlicensed carrier (namely, an unlicensed spectrum). The first scheduling information may be sent by using a licensed spectrum or by using an unlicensed spectrum. In the present disclosure, a spectrum used to send the first scheduling information is not limited.

In the present disclosure, the first scheduling information may be used to schedule the UE to transmit the first TB by using the unlicensed carrier, and the first scheduling information may be dynamic scheduling information or semi-persistent scheduling information. This is not specifically limited in the present disclosure.

For example, when the first scheduling information is dynamic scheduling information, the first scheduling information may be allocated by the base station to the UE after determining that the UE needs to perform uplink transmission, and the first scheduling information may be sent by the base station to the UE after determining that the UE needs to perform uplink transmission.

For another example, when the first scheduling information is semi-persistent scheduling information, the first scheduling information may be allocated by the base station to the UE before determining that the UE needs to perform uplink transmission, and the first scheduling information may be sent by the base station to the UE before determining that the UE needs to perform uplink transmission.

It should be understood that in the present disclosure, both "when" and "if" indicate that the UE or the base station performs corresponding processing in a specific case, are not intended to limit time, do not require the UE or the base station to perform a determining action during implementation, and do not mean that there is another limitation either.

By way of example rather than limitation, in the present disclosure, the first scheduling information schedules a transmission parameter that is used to instruct the UE to transmit the first TB by using the unlicensed carrier. The transmission parameter may include at least one of the following:

a size (such as a quantity of resource blocks (RB)) of a frequency domain resource corresponding to the first TB, a modulation and coding scheme (MCS) index used to determine a size of the first TB, a modulation order corresponding to the first TB, a bit rate corresponding to the first TB, a time domain start position, in the first subframe, at which the UE transmits the first TB, a redundancy version used by the UE when transmitting the first TB, an antenna port used by the UE when transmitting the first TB, and a precoding matrix index used by the UE when transmitting the first TB.

In S220, the UE performs rate matching on the first TB, to generate the uplink data. It should be understood that the rate matching herein includes a set of operations such as coding, interleaving, and rate matching. For how the UE specifically performs the foregoing operations, refer to a rate matching method in the prior art. This is not limited in the present disclosure. In addition, S220 may be performed before the UE performs LBT, or may be performed after the UE performs LBT, or may be simultaneously performed when the UE performs LBT.

In S230, the first subframe is a subframe that is scheduled by the first scheduling information and that is used to transmit the uplink data. It should be noted that the UE may determine, based on the first scheduling information, the first subframe used to transmit the first TB. For example, after receiving the first scheduling information, the UE may determine, based on a predefined time sequence relationship, a first subframe on the unlicensed carrier to be used to transmit the first TB.

The first time domain symbol and the second time domain symbol are any two time domain symbols in the at least two time domain symbols included in the first subframe, and the second time domain symbol is later than the first time domain symbol.

In some examples, the at least two time domain symbols may be specified by a communications system, or configured by the base station by using higher layer signaling, or notified by the base station by using physical layer signaling.

In some examples, the first time domain symbol is a symbol in symbols {0, 1, 2}.

In some examples, the second time domain symbol is a symbol in symbols {4, 5, 6, 7, 8, 9}.

In some examples, that the first subframe includes at least two time domain symbols is specifically that the first subframe includes two time domain symbols.

In some examples, the first time domain symbol in the two time domain symbols included in the first subframe is a symbol 0 or a symbol 1, and the second time domain symbol in the two time domain symbols included in the first subframe is a symbol 7 or a symbol 8.

It should be noted that in S240, that the UE sends the uplink data to the base station from the start time domain symbol may be that the UE sends the uplink data to the base station from a start boundary of the start time domain symbol, or that the UE sends the uplink data to the base station from a time domain start point in the start time domain symbol.

In some examples, the first time domain symbol includes at least one time domain start point that can be used to send the uplink data. For example, the first time domain symbol includes three time domain start points that can be used to send the uplink data. The three time domain start points are a start boundary of the first time domain symbol, a moment that is in the first time domain symbol and a time length between which and the start boundary of the first time domain symbol is a preset value #1 (for example, 25 μs), and a moment that is in the first time domain symbol and a time length between which and the start boundary of the first time domain symbol is a preset value #2 (for example, a sum of 25 μs and a length of a timing advance (TA)).

In some examples, the second time domain symbol includes at least one time domain start point that can be used to send the uplink data. For example, the second time domain symbol includes two time domain start points that can be used to send the uplink data. The two time domain start points are a start boundary of the second time domain symbol and a moment that is in the second time domain symbol and a time length between which and the start boundary of the second time domain symbol is a preset value #1 (for example, 25 μs).

In some examples, the first time domain start point that is in the first time domain symbol and that can be used by the UE to send the uplink data may be configured by the base station by using higher layer signaling, or may be indicated by the base station by using physical layer signaling, or may be pre-specified by a communications system.

In some examples, the second time domain start point that is in the second time domain symbol and that can be used by the UE to send the uplink data may be configured by the base station by using higher layer signaling, or may be indicated by the base station by using physical layer signaling, or may be pre-specified by a communications system.

For example, the base station may configure the start boundary of the symbol 1 as the first time domain start point, and a moment that is in the symbol 7 and that is 25 μs away from a start boundary of the symbol 7 as the second time domain start point.

For another example, the base station may configure a moment that is in the symbol 0 and that is 25 μs away from a start boundary of the symbol 0 as the first time domain start point, and the communications system pre-specifies a start boundary of the symbol 7 as the second time domain start point.

The UE detects the unlicensed carrier, determines, as the start time domain symbol, a time domain symbol that is in the at least two time domain symbols included in the first subframe and whose corresponding first channel is available, and sends the uplink data from the start time domain symbol.

When detecting whether the first subframe on the unlicensed carrier is available, the UE first determines, through channel detection before the first time domain start point in the first time domain symbol, whether the unlicensed carrier is available. If the unlicensed carrier is available, the UE sends the uplink data from the first time domain start point in the first time domain symbol. If the unlicensed carrier is unavailable, the UE continues to detect the unlicensed carrier, and determines, through channel detection before the second time domain start point in the second time domain symbol, whether the unlicensed carrier is available. When detecting that the unlicensed carrier is available, the UE sends the uplink data from the second time domain start point in the second time domain symbol.

In the present disclosure, the time domain symbol may be, for example, an orthogonal frequency division multiplexing (OFDM) symbol or a time domain symbol defined in a 5G system. For brevity, the time domain symbol is sometimes briefly referred to as a symbol.

Figure 3:
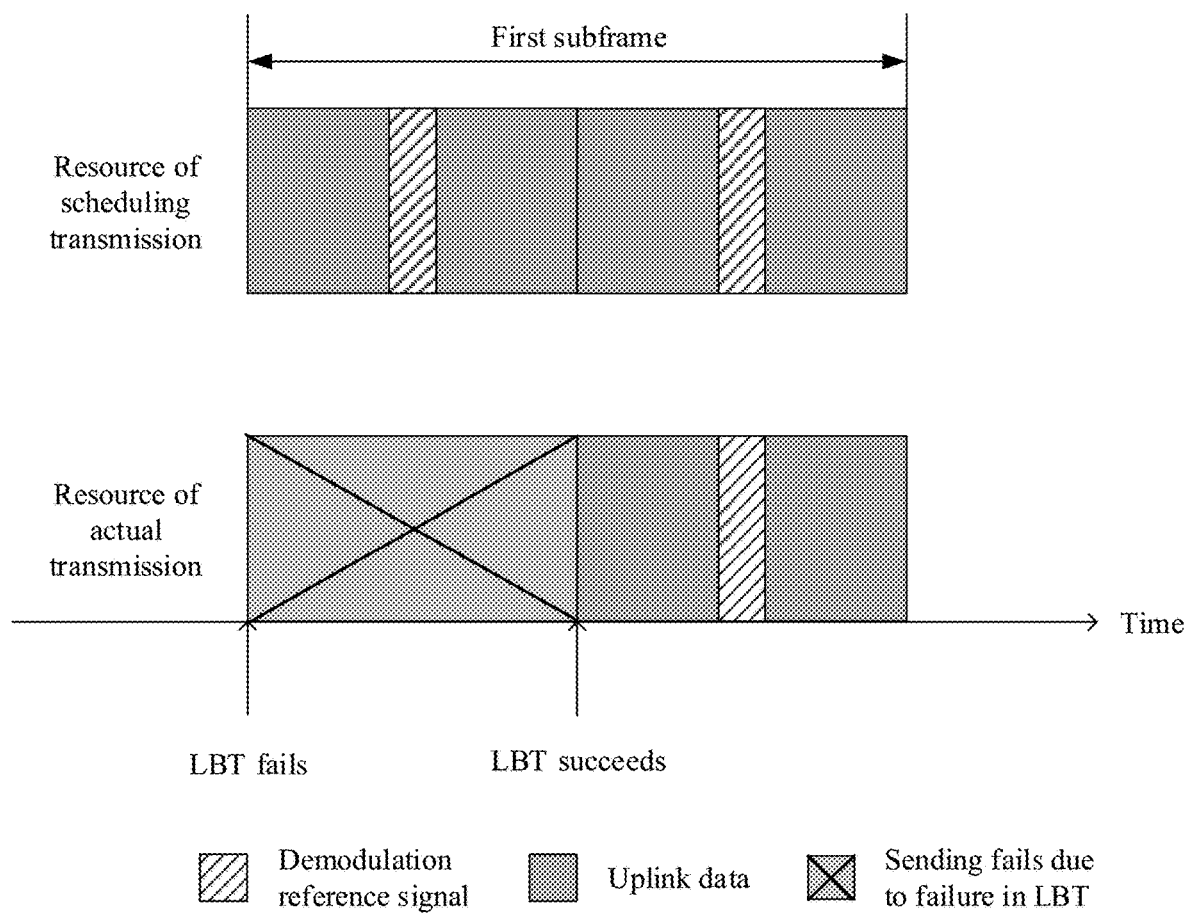
FIG. 3 is a schematic diagram of another uplink data sending method according to one embodiment of the present disclosure.

FIG. 3 is a schematic diagram of another uplink data sending method according to one embodiment of the present disclosure. A first subframe shown in FIG. 3 includes 14 symbols. The 14 symbols are respectively numbered 0, 1, . . . , and 13 from left to right based on a sending sequence of the symbols in the first subframe. The UE determines, based on scheduling information, to send uplink data by using the subframe. The UE detects, before the symbol 0, whether a channel is idle. If the detection succeeds, in other words, if it is detected that the current channel is not used by another device, the UE may transmit the uplink data from a start boundary position of the symbol 0 or a time domain position in the middle of the symbol 0. If the detection fails, in other words, if it is detected that the current channel is occupied by another device, the UE performs detection again or continues to perform detection in the first subframe. When channel detection in a subsequent time domain symbol succeeds, the UE may start to transmit the uplink data from a detection success moment, for example, perform uplink transmission from a start boundary position of the symbol 7 or a time domain position in the middle of the symbol 7. To be specific, if the channel detection of the UE in the symbol 0 in the subframe fails, but the channel detection in the symbol 7 in the subframe succeeds, the terminal device may transmit the uplink data by using a remaining part of the subframe.

In conclusion, according to the uplink data sending method provided in the present disclosure, the terminal device determines a time domain symbol, used to transmit the uplink data, in at least two time domain symbols included in a subframe. When a previous time domain symbol in a time unit cannot be used, the terminal device may transmit the uplink data by using another available time domain symbol in the time unit, thereby increasing a probability of successful transmission in a time unit and improving utilization of an unlicensed spectrum during uplink data transmission.

There are two mapping manners of the uplink data sent by the terminal device. The following separately describes the two cases.

Mapping Manner 1

In some examples, when the start time domain symbol is the first time domain symbol, the uplink data is first uplink data obtained by performing rate matching on the first transport block from the first time domain symbol; or when the start time domain symbol is the second time domain symbol, the uplink data is second uplink data obtained by performing rate matching on the first transport block from the second time domain symbol, where the second uplink data is remaining data in first uplink data after data between the first time domain symbol and the second time domain symbol is removed.

When the previous time domain symbol in the at least two time domain symbols cannot be used to transmit the uplink data and the latter time domain symbol can be used to transmit the uplink data, the terminal device may perform puncture transmission on data mapped on an entire subframe. To be specific, data before the latter time domain symbol is discarded and some data is transmitted only from the latter time domain symbol. Therefore, complexity of sending uplink data by the terminal device is reduced and load of a processor of the terminal device is alleviated.

In some examples, that the terminal device performs rate matching on the first transport block, to obtain the uplink data includes:

performing, by the terminal device, rate matching on the first transport block from the first time domain symbol, to obtain the first uplink data; and that the terminal device sends the uplink data to the access network device from the start time domain symbol includes:

sending, by the terminal device, second uplink data to the access network device from the second time domain symbol, where the second uplink data is remaining data in first uplink data after data between the first time domain symbol and the second time domain symbol is removed.

When the previous time domain symbol in the at least two time domain symbols cannot be used to transmit the uplink data and the latter time domain symbol can be used to transmit the uplink data, the terminal device may perform puncture transmission on data mapped on an entire subframe. To be specific, data before the latter time domain symbol is discarded and some data is transmitted only from the latter time domain symbol. Therefore, complexity of sending uplink data by the terminal device is reduced and load of a processor of the terminal device is alleviated.

In some examples, the terminal device encodes the first transport block, to obtain an encoded first uplink data packet. The encoding process may include adding cyclic redundancy check (CRC), encoding, interleaving, and the like. The process may be similar to an encoding method and process of a communications device (a network device or a terminal device) in the prior art. To avoid repetition, detailed descriptions are omitted herein. The terminal device performs modulation on the encoded first uplink data packet based on a first modulation order, and performs mapping on a modulated symbol from the first time domain symbol based on a sequence of frequency first and time second or time first and frequency second, to obtain first uplink data. When the start time domain symbol is the first time domain symbol, the terminal device sends the first uplink data from the first time domain symbol; or when the start time domain symbol is the second time domain symbol, the terminal device sends second uplink data from the second time domain symbol, where the second uplink data is remaining data in first uplink data after data between the first time domain symbol and the second time domain symbol is removed.

When the previous time domain symbol in the at least two time domain symbols cannot be used to transmit the uplink data and the latter time domain symbol can be used to transmit the uplink data, the terminal device may perform puncture transmission on data mapped on an entire subframe. To be specific, data before the latter time domain symbol is discarded and some data is transmitted only from the latter time domain symbol. Therefore, complexity of sending uplink data by the terminal device is reduced and load of a processor of the terminal device is alleviated.

Figure 4:
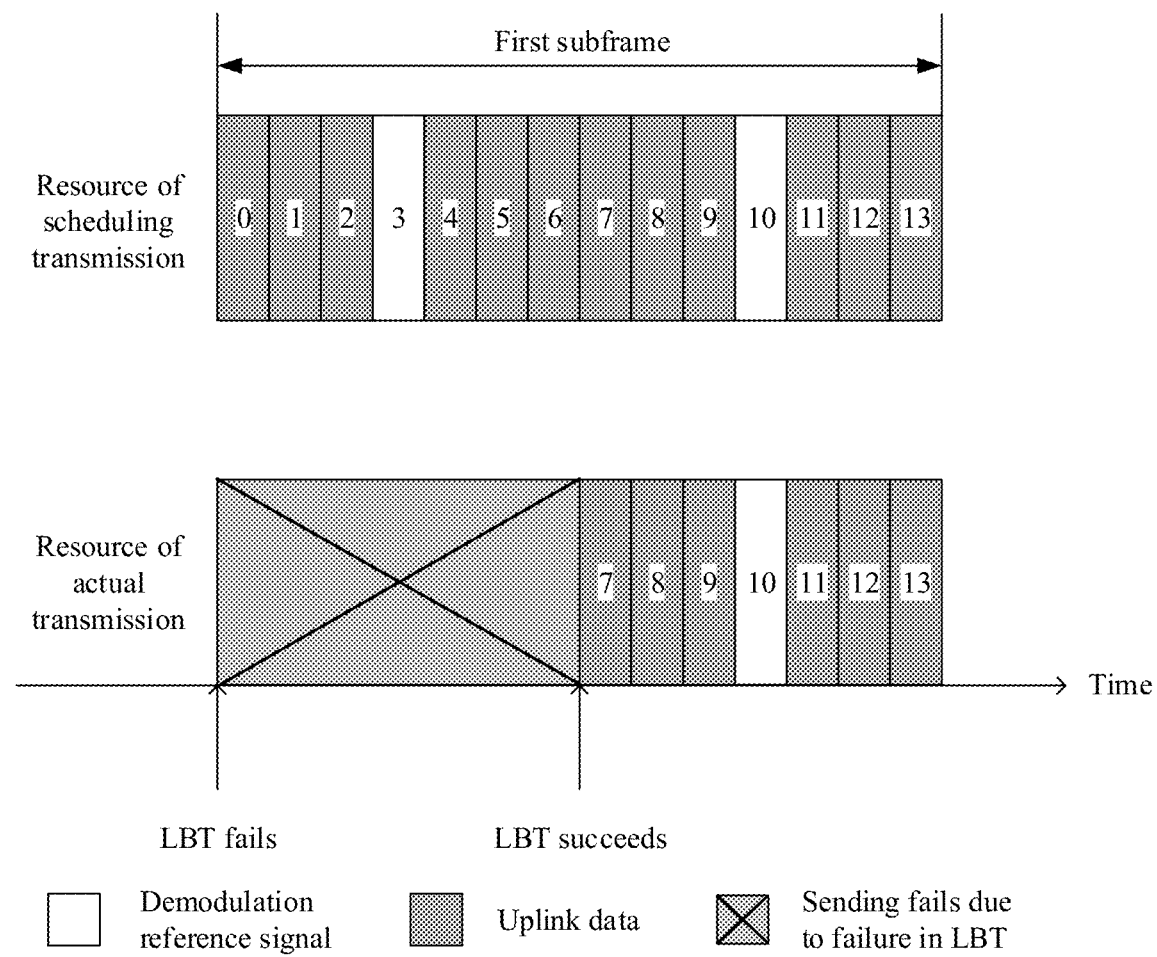
FIG. 4 is a schematic diagram of still another uplink data sending method according to one embodiment of the present disclosure.

FIG. 4 is a schematic diagram of still another uplink data sending method according to one embodiment of the present disclosure. A first subframe shown in FIG. 4 includes 14 symbols. The 14 symbols are respectively numbered 0, 1, . . . , and 13 from left to right based on a sending sequence of the symbols in the first subframe. The UE determines, based on scheduling information, to send uplink data by using the subframe. LBT of the UE fails in the symbol 0 and succeeds in the symbol 7. In this case, the UE may directly discard data mapped on the symbol 0 to the symbol 6 and only transmits data mapped on the symbol 7 to the symbol 13. In this way, the UE does not need to perform packet assembly and mapping again on the data. Compared with transmission in an entire uplink subframe, this does not cause additional complexity.

Mapping Manner 2

In one embodiment, the UE may also perform rate matching on a first TB again, match the encoded and modulated data on resources corresponding to the symbol #7 to the symbol #13. In this way, complexity of processing a task by the UE is increased, but information bits in the front of a data packet are not lost.

In some examples, the terminal device encodes the first transport block, to obtain an encoded first uplink data packet. The encoding process may include adding CRC, encoding, interleaving, and the like. The process may be similar to an encoding method and process of a communications device (a network device or a terminal device) in the prior art. To avoid repetition, detailed descriptions are omitted herein. When the start time domain symbol is the first time domain symbol, the terminal device sends first uplink data from the first time domain symbol. The first uplink data is data obtained after the terminal device modulates the encoded first uplink data packet based on a fourth modulation order, and performs mapping on a modulated symbol from the first time domain symbol based on a sequence of frequency first and time second or time first and frequency second. When the start time domain symbol is the second time domain symbol, the terminal device sends second uplink data from the second time domain symbol. The second uplink data is data obtained after the terminal device modulates the encoded first uplink data packet based on a fifth modulation order, and performs mapping on a modulated symbol from the second time domain symbol based on a sequence of frequency first and time second or time first and frequency second. In some examples, the fourth modulation order is determined based on a second MCS table, and the fifth modulation order is determined based on a first MCS table. In some examples, the fifth modulation order is greater than or equal to the first modulation order.

It should be noted that in an uplink data transmission process, a transport block size (TBS) of the TB that the base station schedules the terminal device to transmit cannot be changed; otherwise, the base station cannot correctly demodulate a signal sent by the UE. Therefore, when a resource preempted by the terminal device do not match a resource scheduled by the base station, the terminal device still performs code transmission based on the TBS scheduled by the base station.

It may be understood that when the UE performs uplink transmission in a puncture manner (namely, the mapping manner 1), some information bits in the front of the data packet are discarded. However, when the terminal device performs uplink transmission in a manner of performing rate matching again (namely, the mapping manner 2), the information bits in the front of the data packet are not lost. Therefore, when TBs of a same TBS are transmitted, performance of transmitting by the terminal device in the manner of performing rate matching again is better than that of transmitting by the terminal device in the puncture manner, but implementation complexity of performing rate matching again is higher.

In some examples, before the terminal device performs rate matching on the first transport block, the method 200 further includes the following operation.

Operation S250. The terminal device receives first indication information from the access network device, where the first indication information is used to indicate a first transmission mode or a second transmission mode, the first transmission mode is sending the uplink data from the first time domain symbol or the second time domain symbol, and the second transmission mode is sending the uplink data from the first time domain symbol and skipping sending the uplink data from the second time domain symbol.

For example, the first indication information may be one bit. When the bit is "0", the UE is instructed to send the uplink data by using the second transmission mode; or when the bit is "1", the UE is instructed to send the uplink data by using the first transmission mode.

For another example, whether the first indication information exists may be used to indicate the first transmission mode and the second transmission mode. For example, when the UE receives the first indication information, the first indication information instructs the UE to send the uplink data by using the first transmission mode; otherwise, the UE sends the uplink data by using the second transmission mode.

For another example, the first indication information may be sent in a form of a reference signal. When the reference signal occurs, the UE sends the uplink data by using the first transmission mode; otherwise, the UE sends the uplink data by using the second transmission mode.

For another example, different reference signals may be used to indicate the first transmission mode and the second transmission mode.

For another example, different radio network temporary identifier (RNTI) scrambling codes may be used to indicate the first transmission mode and the second transmission mode. A specific form and sending manner of the first indication information are not limited in the present disclosure.

According to the uplink data sending method provided in this embodiment, the base station indicates a transmission mode of the UE, so that the transmission mode can be flexibly selected based on an actual situation.

In some examples, the first time domain symbol is a time domain symbol that is in the at least two time domain symbols and that is closest to a start boundary of the first subframe.

In some communications systems, a new device that can use the uplink data sending method provided in the present disclosure exists and an old device that cannot use the uplink data sending method provided in the present disclosure also exists. The old device cannot determine the start time domain symbol in a plurality of time domain symbols, and can send uplink data only from a fixed time domain symbol in a subframe. Therefore, according to the method provided in the present disclosure, the access network device instructs the new device to send uplink data only from a time domain symbol closest to a boundary of the subframe, so that a case in which the uplink data cannot be sent because the old device is locked by the new device is avoided, and a new communications system is compatible with the old device. The fixed time domain symbol of the old device and the first time domain symbol of the new device may be a same symbol, and a time domain start point that is of the old device and that is used to send the uplink data and a time domain start point of the new device in the first time domain symbol may be a same time domain start point.

Figure 5:
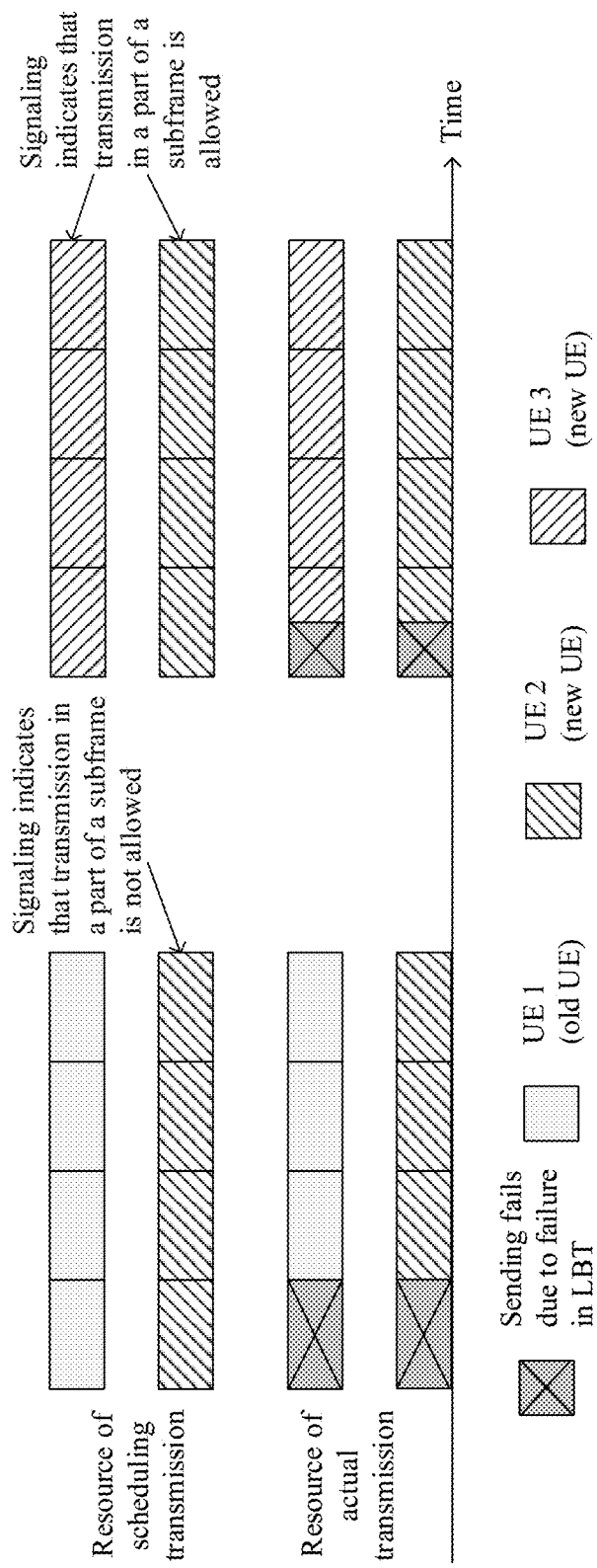
FIG. 5 is a schematic diagram of still another uplink data sending method according to one embodiment of the present disclosure.

FIG. 5 is a schematic diagram of sending uplink data by a terminal device in a communications system in which a plurality of terminal devices coexist. Each rectangle in FIG. 5 represents a subframe, new UE can send uplink data in the middle of the subframe, but old UE can send the uplink data only at a start boundary of a first time domain symbol.

When the new UE and the old UE coexist, if the new UE receives signaling indicating that the new UE does not support transmission in a part of the subframe, the new UE and the old UE may reuse an unlicensed carrier to send the uplink data, where that the new UE and the old UE may reuse the unlicensed carrier is determined by a base station. As shown in the left side of FIG. 5, if the new UE does not receive the signaling indicating that the new UE does not support transmission in a part of the subframe (or the new UE receives a signaling indicating that the new UE supports transmission in a part of the subframe), the new UE may start to send the uplink data after LBT succeeds in the middle of the subframe. The old UE cannot reuse the unlicensed carrier because LBT performed by the old UE before a next subframe fails due to transmission of the new UE.

The signaling may be dynamic signaling or higher layer signaling. The signaling may indicate whether a subframe supports transmission in a part of the subframe or indicate whether a plurality of consecutive subframes (for example, in an uplink multi-subframe scheduling scenario) support transmission in a part of the subframe, thereby increasing flexibility of sending uplink data by UE.

In one embodiment, the signaling (that is, first indication information in the following) is included in the first scheduling information, and the first scheduling information is carried by a physical downlink control channel having an uplink scheduling grant (Uplink_grant, UL grant) function. Further, for single-subframe scheduling, to be specific, when UL_grant schedules a transport block in one uplink subframe, the first indication information in UL_grant is used to indicate a specific transmission mode of the uplink subframe, for example, the first transmission mode or the second transmission mode. For multi-subframe scheduling, to be specific, when UL_grant schedules transport blocks in at least two uplink subframes, for example, schedules transport blocks in four uplink subframes, the first indication information in UL_grant is used to indicate a specific transmission mode of a first uplink subframe or first two uplink subframes in the scheduled at least two uplink subframes, for example, the first transmission mode or the second transmission mode. A transmission mode of other scheduled uplink subframes in the at least two uplink subframes is the second transmission mode by default. In other words, the transmission mode used by these subframes is not indicated by the first indication information.

When the old UE does not exist in the communications system, the base station may indicate, by using the foregoing signaling, that the new UE supports transmission in a part of the subframe, and the new UE may continue to perform LBT at a position other than a start boundary of the subframe after LBT at the start boundary of the subframe fails. As shown in the right side of FIG. 5, LBT performed by two new UEs in the middle of the subframe succeeds, and the two new UEs start to reuse an unlicensed carrier from the middle of the subframe to send the uplink data, thereby improving resource utilization.

In some examples, that the terminal device performs rate matching on the first transport block includes the following operations.

Operation S260. The terminal device determines a first modulation order in an MCS configuration set based on an MCS index.

Operation S270. The terminal device performs rate matching on the first transport block based on the first modulation order.

When the first indication information indicates the first transmission mode, the MCS configuration set is a first MCS configuration set; or when the first indication information indicates the second transmission mode, the MCS configuration set is a second MCS configuration set, where the first MCS configuration set is different from the second MCS configuration set.

When the start time domain symbol used to send the uplink data is different, a bit rate of the uplink data may also be different. In a subframe, a different MCS configuration set is selected based on a different transmission mode, so that a proper bit rate may be determined based on an actual situation, thereby improving flexibility and reliability of uplink data transmission.

The first MCS configuration set and the second MCS configuration set may correspond to different MCS tables or may be different parts of a same MCS table.

In some examples, the method 200 further includes the following operation.

Operation S280. The terminal device determines a first modulation order in a first MCS configuration set based on a first MCS index, and performs rate matching on the first transport block based on the first modulation order; and the terminal device determines a second modulation order in a second MCS configuration set, and performs rate matching on a second transport block based on the second modulation order, where the second transport block is transmitted by using a second subframe, and the first MCS configuration set is different from the second MCS configuration set.

A start time domain symbol used to send the uplink data in a different subframe may be different. Therefore, a bit rate at which the terminal device sends the uplink data by using the different subframe may also be different. A different MCS configuration set is selected for the different subframe, so that a proper bit rate may be determined based on an actual situation, thereby improving flexibility and reliability of uplink data transmission.

In some examples, when the base station schedules, for the UE, a plurality of consecutive TTIs for uplink transmission, it may be predefined or preconfigured that a modulation order 1 is determined based on the first MCS configuration set in a first TTI or first several TTIs in the plurality of consecutive TTIs, and a modulation order 2 is determined based on the second MCS configuration set in the remaining at least one TTI including a last TTI, where the modulation order 1 is greater than or equal to the modulation order 2. Alternatively, it may be predefined or preconfigured that a modulation order 2 is determined based on the second MCS configuration set in a last TTI or several last TTIs in the plurality of consecutive TTIs, and a modulation order 1 is determined based on the first MCS configuration set in the remaining at least one TTI including a first TTI. This is mainly because that in a process of continuous uplink transmission in the plurality of TTIs, due to LBT, a probability of sending data by the terminal device by using a part of the subframe on the first several TTIs is greater than a probability of sending data by using a part of the subframe on the last several TTIs. As a compromise, a to-be-used modulation order may be determined by the UE based on a time domain position of the uplink subframe.

In some examples, when the base station schedules, for the UE, a plurality of consecutive TTIs for uplink transmission, it may be predefined or preconfigured that a modulation order 2 is determined based on the second MCS configuration set in a first TTI or first several TTIs in the plurality of consecutive TTIs, and a modulation order 1 is determined based on the first MCS configuration set in the remaining at least one TTI including a last TTI, where the modulation order 1 is greater than or equal to the modulation order 2. Alternatively, it may be predefined or preconfigured that a modulation order 1 is determined based on the first MCS configuration set in a last TTI or several last TTIs in the plurality of consecutive TTIs, and a modulation order 2 is determined based on the second MCS configuration set in the remaining at least one TTI including a first TTI.

In some examples, the terminal device determines a first modulation order in a first MCS configuration set based on a first MCS index, and performs rate matching on the first transport block based on the first modulation order; and the terminal device determines a sixth modulation order in a second MCS configuration set, and performs rate matching on a fourth transport block based on the sixth modulation order, where the fourth transport block is transmitted by using a licensed carrier, and the first MCS configuration set is different from the second MCS configuration set. Specifically, in this embodiment, the first MCS configuration set is an MCS configuration set used when the first transport block is transmitted on the unlicensed carrier, and the second MCS configuration set is an MCS configuration set used when the fourth transport block is transmitted on the licensed carrier.

In some examples, that the first MCS configuration set is different from the second MCS configuration set includes: a modulation order, corresponding to the first MCS index, in the first MCS configuration set is greater than or equal to a modulation order, corresponding to the first MCS index, in the second MCS configuration set.

For a same MCS index, a modulation order, corresponding to the MCS index, in the first MCS configuration set is greater than or equal to a modulation order, corresponding to the MCS index, in the second MCS configuration set. In the foregoing embodiment, when the uplink data is sent by using the first transmission mode or the first subframe, it is possible that the uplink data is sent from the second time domain symbol in the first subframe, and a larger modulation order in the first MCS configuration set may be used. Therefore, a bit rate may be reduced, and a probability of successful decoding of the base station is increased.

In some examples, a first bit rate of a third transport block corresponding to a third modulation order in the first MCS configuration set is less than a preset value, the first bit rate is a bit rate of uplink data that is transmitted from the second time domain symbol and that corresponds to the third transport block, and the third modulation order is a modulation order other than a highest modulation order in the first MCS configuration set.

The preset value may be set based on a decoding capacity of the base station and a current communication environment. When a bit rate of a TB is greater than the preset value, a modulation order is increased and the bit rate is reduced, so that a probability of successful decoding of the base station may be increased.

In some examples, the preset value is specified by the communications system.

In some examples, the preset value is a value greater than or equal to 0.93. For example, the preset value is 0.931. For another example, the preset value is 1.

In some examples, the method 200 further includes the following operation.

Operation S290. The terminal device receives second indication information from the access network device, where the second indication information is used to indicate the first MCS configuration set or the second MCS configuration set.

The access network device may schedule, by using the second indication information, an MCS configuration set used by the terminal device in a subframe or a start time domain symbol, thereby increasing flexibility of uplink transmission. The second indication information may indicate to the UE in a manner similar to a manner in which the first indication information indicates to the UE. A specific form and transmission mode of the second indication information are not limited in the present disclosure.

In some examples, the method 200 further includes the following operation.

Operation S291. The terminal device sends third indication information to the access network device, where the third indication information is used to indicate the start time domain symbol.

Therefore, the access network device may obtain the start time domain symbol determined by the terminal device. The third indication information may indicate to the UE in a manner similar to a manner in which the first indication information indicates to the UE. A specific form and transmission mode of the third indication information are not limited in the present disclosure.

In some examples, the method 200 further includes the following operation.

Operation S292. The terminal device receives fourth indication information from the access network device, where the fourth indication information is used to instruct the terminal device to send the uplink data by using the mapping manner 1 or the mapping manner 2.

As mentioned above, performance of transmitting the uplink data by using the mapping manner 2 is better than that of transmitting the uplink data by using the mapping manner 1, but the mapping manner 2 is more complex, and therefore, needs a capacity support of the terminal device. The fourth indication information may indicate to the UE in a manner similar to a manner in which the first indication information indicates to the UE. A specific form and transmission mode of the fourth indication information are not limited in the present disclosure.

Therefore, for a terminal device supporting the mapping manner 2, the access network device may instruct, by using the fourth indication information, the terminal device to send the uplink data based on the mapping manner 2, so that the terminal device achieves better transmission performance.

Because the mapping manner 2 needs the capacity support of the terminal device, in some examples, the terminal device reports, to the access network device, whether the terminal device has a capacity of supporting the mapping manner 2, so that the access network device determines whether to instruct the terminal device to send the uplink data based on the mapping manner 2.

The following gives several tables including the first MCS configuration set and/or the second MCS configuration set that are applicable to the present disclosure.

For example, Table 1 is an example of a table including the second MCS configuration set, and Table 2 is an example of a table including the first MCS configuration set. It should be noted that modulation orders included in Table 1 and Table 2 are QPSK (or a modulation order is 2), 16QAM (or a modulation order is 4), and 64QAM (or a modulation order is 6).

It can be learnt from Table 1 that when a frequency domain transmission resource is fixed (for example, 100 RB), a unique TBS may be determined based on a same MCS index. When a corresponding MCS configuration set is the second MCS configuration set, a bit rate (for example, a bit rate 1) at which the UE transmits the uplink data from the first time domain symbol (for example, a symbol 0) is less than the preset value 0.931 when an MCS index is any value, but a bit rate (for example, a bit rate 2) at which the UE transmits the uplink data from the second time domain symbol (for example, a symbol 7) is greater than the preset value 0.931 when a value of an MCS index is 8 to 10 and 15 to 28. Therefore, the second MCS configuration set is an MCS configuration set matching the transmission of the uplink data from the first time domain symbol (for example, the symbol 0).

It can be learnt from Table 2 that when a frequency domain transmission resource is fixed (for example, 100 RB), a unique TBS may be determined based on a same MCS index. When a corresponding MCS configuration set is the first MCS configuration set, a bit rate (for example, a bit rate 2) at which the UE transmits the uplink data from the second time domain symbol (for example, a symbol 7) is less than the preset value 0.931 when a modulation order corresponding to a value of an MCS index is QPSK and 16QAM. It should be noted that because a modulation order higher than 64QAM is not included in Table 1, a case in which a bit rate is greater than the preset value 0.931 is included when a modulation order corresponding to a value of an MCS index is 64QAM. In addition, because of an unmatched modulation order, performance loss is caused to a bit rate (for example, the bit rate 1) at which the UE transmits the uplink data from the first time domain symbol (for example, the symbol 0) when a value of an MCS index is 8 to 10 and 15 to 20. Therefore, the first MCS configuration set is an MCS configuration set matching the transmission of the uplink data from the second time domain symbol (for example, the symbol 7). The third modulation order may be a modulation order in the first MCS configuration set corresponding to any one of values 0 to 14 of the MCS index in Table 2.

For another example, Table 3 is an example including the first MCS configuration set and the second MCS configuration set. Modulation orders included in Table 3 include QPSK, 16QAM, and 64QAM, and the third modulation order may be a modulation order in the first MCS configuration set corresponding to any one of values 0 to 14 of the MCS index in Table 3.

For another example, Table 4 is another example including the first MCS configuration set and the second MCS configuration set. Modulation orders included in Table 4 include QPSK, 16QAM, and 64QAM, and the third modulation order may be a modulation order in the first MCS configuration set corresponding to any one of values 0 to 14 of the MCS index in Table 4.

For example, Table 5 is an example of a table including the second MCS configuration set, and Table 6 is an example of a table including the first MCS configuration set. It should be noted that modulation orders included in Table 5 and Table 6 are QPSK, 16QAM, 64QAM, and 256QAM (or a modulation order is 8).

It can be learnt from Table 5 that when a frequency domain transmission resource is fixed (for example, 100 RB), a unique TBS may be determined based on a same MCS index. When a corresponding MCS configuration set is the second MCS configuration set, a bit rate (for example, a bit rate 1) at which the UE transmits the uplink data from the first time domain symbol (for example, a symbol 0) is less than the preset value 0.931 when an MCS index is any value, but a bit rate (for example, a bit rate 2) at which the UE transmits the uplink data from the second time domain symbol (for example, a symbol 7) is greater than the preset value 0.931 when a value of an MCS index is 4, 5, and 9 to 28. Therefore, the second MCS configuration set is an MCS configuration set matching the transmission of the uplink data from the first time domain symbol (for example, the symbol 0).

It can be learnt from Table 6 that when a frequency domain transmission resource is fixed (for example, 100 RB), a unique TBS may be determined based on a same MCS index. When a corresponding MCS configuration set is the first MCS configuration set, a bit rate (for example, a bit rate 2) at which the UE transmits the uplink data from the second time domain symbol (for example, a symbol 7) is less than the preset value 0.931 when a modulation order corresponding to a value of an MCS index is QPSK, 16QAM, and 64QAM. It should be noted that because a modulation order higher than 256QAM is not included in Table 6, a case in which a bit rate is greater than the preset value 0.931 is included when a modulation order corresponding to a value of an MCS index is 256QAM. In addition, because of an unmatched modulation order, performance loss is caused to a bit rate (for example, the bit rate 1) at which the UE transmits the uplink data from the first time domain symbol (for example, a symbol 0) when a value of an MCS index is 4, 5, and 9 to 22. Therefore, the first MCS configuration set is an MCS configuration set matching the transmission of the uplink data from the second time domain symbol (for example, the symbol 7). The third modulation order may be a modulation order in the first MCS configuration set corresponding to any one of values 0 to 12 of the MCS index in Table 6.

For another example, Table 7 is an example including the first MCS configuration set and the second MCS configuration set. Modulation orders included in Table 7 include QPSK, 16QAM, 64QAM, and 256QAM, and the third modulation order may be a modulation order in the first MCS configuration set corresponding to any one of values 0 to 12 of the MCS index in Table 7.

TABLE 1

| MCS index | TBS index | TBS corresponding to 100 RB | Second MCS configuration set | Bit rate 1 (the first time domain symbol is a symbol 0) | Bit rate 2 (the second time domain symbol is a symbol 7) |
|---|---|---|---|---|---|
| 0 | 0 | 2792 | 2 | 0.098 | 0.196 |
| 1 | 1 | 3624 | 2 | 0.127 | 0.253 |
| 2 | 2 | 4584 | 2 | 0.160 | 0.320 |
| 3 | 3 | 5736 | 2 | 0.200 | 0.400 |
| 4 | 4 | 7224 | 2 | 0.253 | 0.507 |
| 5 | 5 | 8760 | 2 | 0.307 | 0.613 |
| 6 | 6 | 10296 | 2 | 0.360 | 0.720 |
| 7 | 7 | 12216 | 2 | 0.427 | 0.853 |

TABLE 1-continued

| MCS index | TBS index | TBS corresponding to 100 RB | Second MCS configuration set | Bit rate 1 (the first time domain symbol is a symbol 0) | Bit rate 2 (the second time domain symbol is a symbol 7) |
|---|---|---|---|---|---|
| 8  | 8  | 14112 | 2 | 0.493 | 0.987 |
| 9  | 9  | 15840 | 2 | 0.553 | 1.107 |
| 10 | 10 | 17568 | 2 | 0.613 | 1.227 |
| 11 | 10 | 17568 | 4 | 0.307 | 0.613 |
| 12 | 11 | 19848 | 4 | 0.347 | 0.693 |
| 13 | 12 | 22920 | 4 | 0.400 | 0.800 |
| 14 | 13 | 25456 | 4 | 0.444 | 0.889 |
| 15 | 14 | 28336 | 4 | 0.494 | 0.989 |
| 16 | 15 | 30576 | 4 | 0.533 | 1.067 |
| 17 | 16 | 32856 | 4 | 0.573 | 1.147 |
| 18 | 17 | 36696 | 4 | 0.640 | 1.280 |
| 19 | 18 | 39232 | 4 | 0.684 | 1.369 |
| 20 | 19 | 43816 | 4 | 0.764 | 1.529 |
| 21 | 19 | 43816 | 6 | 0.510 | 1.019 |
| 22 | 20 | 46888 | 6 | 0.545 | 1.090 |
| 23 | 21 | 51024 | 6 | 0.593 | 1.187 |
| 24 | 22 | 55056 | 6 | 0.640 | 1.280 |
| 25 | 23 | 57336 | 6 | 0.667 | 1.333 |
| 26 | 24 | 61664 | 6 | 0.717 | 1.434 |
| 27 | 25 | 63776 | 6 | 0.741 | 1.483 |
| 28 | 26 | 75376 | 6 | 0.876 | 1.753 |

TABLE 2

| MCS index | TBS index | TBS corresponding to 100 RB | First MCS configuration set | Bit rate 1 (the first time domain symbol is a symbol 0) | Bit rate 2 (the second time domain symbol is a symbol 7) |
|---|---|---|---|---|---|
| 0  | 0  | 2792  | 2 | 0.098 | 0.196 |
| 1  | 1  | 3624  | 2 | 0.127 | 0.253 |
| 2  | 2  | 4584  | 2 | 0.160 | 0.320 |
| 3  | 3  | 5736  | 2 | 0.200 | 0.400 |
| 4  | 4  | 7224  | 2 | 0.253 | 0.507 |
| 5  | 5  | 8760  | 2 | 0.307 | 0.613 |
| 6  | 6  | 10296 | 2 | 0.360 | 0.720 |
| 7  | 7  | 12216 | 2 | 0.427 | 0.853 |
| 8  | 8  | 14112 | 4 | 0.247 | 0.493 |
| 9  | 9  | 15840 | 4 | 0.277 | 0.553 |
| 10 | 10 | 17568 | 4 | 0.307 | 0.613 |
| 11 | 10 | 17568 | 4 | 0.307 | 0.613 |
| 12 | 11 | 19848 | 4 | 0.347 | 0.693 |
| 13 | 12 | 22920 | 4 | 0.400 | 0.800 |
| 14 | 13 | 25456 | 4 | 0.444 | 0.889 |
| 15 | 14 | 28336 | 6 | 0.330 | 0.659 |
| 16 | 15 | 30576 | 6 | 0.356 | 0.711 |
| 17 | 16 | 32856 | 6 | 0.382 | 0.764 |
| 18 | 17 | 36696 | 6 | 0.427 | 0.853 |
| 19 | 18 | 39232 | 6 | 0.456 | 0.913 |
| 20 | 19 | 43816 | 6 | 0.510 | 1.019 |
| 21 | 19 | 43816 | 6 | 0.510 | 1.019 |
| 22 | 20 | 46888 | 6 | 0.545 | 1.090 |
| 23 | 21 | 51024 | 6 | 0.593 | 1.187 |
| 24 | 22 | 55056 | 6 | 0.640 | 1.280 |
| 25 | 23 | 57336 | 6 | 0.667 | 1.333 |
| 26 | 24 | 61664 | 6 | 0.717 | 1.434 |
| 27 | 25 | 63776 | 6 | 0.741 | 1.483 |
| 28 | 26 | 75376 | 6 | 0.876 | 1.753 |

TABLE 3

| MCS index | Second MCS configuration set | First MCS configuration set | TBS index | Redundancy version |
|---|---|---|---|---|
| 0  | 2 | 2 | 0  | 0 |
| 1  | 2 | 2 | 1  | 0 |
| 2  | 2 | 2 | 2  | 0 |
| 3  | 2 | 2 | 3  | 0 |
| 4  | 2 | 2 | 4  | 0 |
| 5  | 2 | 2 | 5  | 0 |
| 6  | 2 | 2 | 6  | 0 |
| 7  | 2 | 2 | 7  | 0 |
| 8  | 2 | 4 | 8  | 0 |
| 9  | 2 | 4 | 9  | 0 |
| 10 | 2 | 4 | 10 | 0 |
| 11 | 4 | 4 | 10 | 0 |
| 12 | 4 | 4 | 11 | 0 |
| 13 | 4 | 4 | 12 | 0 |
| 14 | 4 | 4 | 13 | 0 |
| 15 | 4 | 6 | 14 | 0 |
| 16 | 4 | 6 | 15 | 0 |
| 17 | 4 | 6 | 16 | 0 |
| 18 | 4 | 6 | 17 | 0 |
| 19 | 4 | 6 | 18 | 0 |
| 20 | 4 | 6 | 19 | 0 |
| 21 | 6 | 6 | 19 | 0 |
| 22 | 6 | 6 | 20 | 0 |
| 23 | 6 | 6 | 21 | 0 |
| 24 | 6 | 6 | 22 | 0 |
| 25 | 6 | 6 | 23 | 0 |
| 26 | 6 | 6 | 24 | 0 |
| 27 | 6 | 6 | 25 | 0 |
| 28 | 6 | 6 | 26 | 0 |
| 29 | Reserved | | | 1 |
| 30 | | | | 2 |
| 31 | | | | 3 |

TABLE 4

| MCS index | Second MCS configuration set | First MCS configuration set | TBS index | Redundancy version |
|---|---|---|---|---|
| 0  | 2 | 2 | 0  | 0 |
| 1  | 2 | 2 | 1  | 0 |
| 2  | 2 | 2 | 2  | 0 |
| 3  | 2 | 2 | 3  | 0 |
| 4  | 2 | 2 | 4  | 0 |
| 5  | 2 | 2 | 5  | 0 |
| 6  | 2 | 2 | 6  | 0 |
| 7  | 2 | 6 | 7  | 0 |
| 8  | 2 | 4 | 8  | 0 |
| 9  | 2 | 4 | 9  | 0 |
| 10 | 2 | 4 | 10 | 0 |
| 11 | 4 | 4 | 10 | 0 |
| 12 | 4 | 4 | 11 | 0 |
| 13 | 4 | 4 | 12 | 0 |
| 14 | 4 | 4 | 13 | 0 |
| 15 | 4 | 6 | 14 | 0 |
| 16 | 4 | 6 | 15 | 0 |
| 17 | 4 | 6 | 16 | 0 |
| 18 | 4 | 6 | 17 | 0 |
| 19 | 4 | 6 | 18 | 0 |
| 20 | 4 | 6 | 19 | 0 |
| 21 | 6 | 6 | 19 | 0 |
| 22 | 6 | 6 | 20 | 0 |
| 23 | 6 | 6 | 21 | 0 |
| 24 | 6 | 6 | 22 | 0 |
| 25 | 6 | 6 | 23 | 0 |
| 26 | 6 | 6 | 24 | 0 |
| 27 | 6 | 6 | 25 | 0 |
| 28 | 6 | 6 | 26 | 0 |
| 29 | Reserved | | | 1 |
| 30 | | | | 2 |
| 31 | | | | 3 |

TABLE 5

| MCS index | TBS index | TBS corresponding to 100 RB | Second MCS configuration set | Bit rate 1 (the first time domain symbol is a symbol 0) | Bit rate 2 (the first time domain symbol is a symbol 7) |
|---|---|---|---|---|---|
| 0 | 0 | 2792 | 2 | 0.098 | 0.196 |
| 1 | 2 | 4584 | 2 | 0.160 | 0.320 |
| 2 | 4 | 7224 | 2 | 0.253 | 0.507 |
| 3 | 6 | 10296 | 2 | 0.360 | 0.720 |
| 4 | 8 | 14112 | 2 | 0.493 | 0.987 |
| 5 | 10 | 17568 | 2 | 0.613 | 1.227 |
| 6 | 11 | 19848 | 4 | 0.347 | 0.693 |
| 7 | 12 | 22920 | 4 | 0.400 | 0.800 |
| 8 | 13 | 25456 | 4 | 0.444 | 0.889 |
| 9 | 14 | 28336 | 4 | 0.494 | 0.989 |
| 10 | 16 | 32856 | 4 | 0.573 | 1.147 |
| 11 | 17 | 36696 | 4 | 0.640 | 1.280 |
| 12 | 18 | 39232 | 4 | 0.684 | 1.369 |
| 13 | 19 | 43816 | 4 | 0.764 | 1.529 |
| 14 | 20 | 46888 | 6 | 0.545 | 1.090 |
| 15 | 21 | 51024 | 6 | 0.593 | 1.187 |
| 16 | 22 | 55056 | 6 | 0.640 | 1.280 |
| 17 | 23 | 57336 | 6 | 0.667 | 1.333 |
| 18 | 24 | 61664 | 6 | 0.717 | 1.434 |
| 19 | 25 | 63776 | 6 | 0.741 | 1.483 |
| 20 | 27 | 66592 | 6 | 0.774 | 1.548 |
| 21 | 28 | 71112 | 6 | 0.827 | 1.653 |
| 22 | 29 | 73712 | 6 | 0.857 | 1.714 |
| 23 | 30 | 78704 | 8 | 0.686 | 1.372 |
| 24 | 31 | 81176 | 8 | 0.708 | 1.416 |
| 25 | 32 | 84760 | 8 | 0.739 | 1.478 |
| 26 | 32A | 93800 | 8 | 0.818 | 1.636 |
| 27 | 33 | 97896 | 8 | 0.853 | 1.707 |
| 28 | 34 | 105528 | 8 | 0.920 | 1.840 |

TABLE 6

| MCS index | TBS index | TBS corresponding to 100 RB | First MCS configuration set | Bit rate 1 (the first time domain symbol is a symbol 0) | Bit rate 2 (the first time domain symbol is a symbol 7) |
|---|---|---|---|---|---|
| 0 | 0 | 2792 | 2 | 0.098 | 0.196 |
| 1 | 2 | 4584 | 2 | 0.160 | 0.320 |
| 2 | 4 | 7224 | 2 | 0.253 | 0.507 |
| 3 | 6 | 10296 | 2 | 0.360 | 0.720 |
| 4 | 8 | 14112 | 4 | 0.247 | 0.493 |
| 5 | 10 | 17568 | 4 | 0.307 | 0.613 |
| 6 | 11 | 19848 | 4 | 0.347 | 0.693 |
| 7 | 12 | 22920 | 4 | 0.400 | 0.800 |
| 8 | 13 | 25456 | 4 | 0.444 | 0.889 |
| 9 | 14 | 28336 | 6 | 0.330 | 0.659 |
| 10 | 16 | 32856 | 6 | 0.382 | 0.764 |
| 11 | 17 | 36696 | 6 | 0.427 | 0.853 |
| 12 | 18 | 39232 | 6 | 0.456 | 0.913 |
| 13 | 19 | 43816 | 8 | 0.382 | 0.764 |
| 14 | 20 | 46888 | 8 | 0.409 | 0.818 |
| 15 | 21 | 51024 | 8 | 0.445 | 0.890 |
| 16 | 22 | 55056 | 8 | 0.480 | 0.960 |
| 17 | 23 | 57336 | 8 | 0.500 | 1.000 |
| 18 | 24 | 61664 | 8 | 0.538 | 1.076 |
| 19 | 25 | 63776 | 8 | 0.556 | 1.112 |
| 20 | 27 | 66592 | 8 | 0.581 | 1.161 |
| 21 | 28 | 71112 | 8 | 0.620 | 1.240 |
| 22 | 29 | 73712 | 8 | 0.643 | 1.286 |
| 23 | 30 | 78704 | 8 | 0.686 | 1.372 |
| 24 | 31 | 81176 | 8 | 0.708 | 1.416 |
| 25 | 32 | 84760 | 8 | 0.739 | 1.478 |
| 26 | 32A | 93800 | 8 | 0.818 | 1.636 |
| 27 | 33 | 97896 | 8 | 0.853 | 1.707 |
| 28 | 34 | 105528 | 8 | 0.920 | 1.840 |

TABLE 7

| MCS index | Second MCS configuration set | First MCS configuration set | TBS index | Redundancy version |
|---|---|---|---|---|
| 0 | 2 | 2 | 0 | 0 |
| 1 | 2 | 2 | 2 | 0 |
| 2 | 2 | 2 | 4 | 0 |
| 3 | 2 | 2 | 6 | 0 |
| 4 | 2 | 4 | 8 | 0 |
| 5 | 2 | 4 | 10 | 0 |
| 6 | 4 | 4 | 11 | 0 |
| 7 | 4 | 4 | 12 | 0 |
| 8 | 4 | 4 | 13 | 0 |
| 9 | 4 | 6 | 14 | 0 |
| 10 | 4 | 6 | 16 | 0 |
| 11 | 4 | 6 | 17 | 0 |
| 12 | 4 | 6 | 18 | 0 |
| 13 | 4 | 8 | 19 | 0 |
| 14 | 6 | 8 | 20 | 0 |
| 15 | 6 | 8 | 21 | 0 |
| 16 | 6 | 8 | 22 | 0 |
| 17 | 6 | 8 | 23 | 0 |
| 18 | 6 | 8 | 24 | 0 |
| 19 | 6 | 8 | 25 | 0 |
| 20 | 6 | 8 | 27 | 0 |
| 21 | 6 | 8 | 28 | 0 |
| 22 | 6 | 8 | 29 | 0 |
| 23 | 8 | 8 | 30 | 0 |
| 24 | 8 | 8 | 31 | 0 |
| 25 | 8 | 8 | 32 | 0 |
| 26 | 8 | 8 | 32A | 0 |
| 27 | 8 | 8 | 33 | 0 |
| 28 | 8 | 8 | 34 | 0 |
| 29 | Reserved | | | 1 |
| 30 | | | | 2 |
| 31 | | | | 3 |

The foregoing describes the uplink data sending method provided in the present disclosure in detail from a perspective of UE. The following describes an uplink data receiving method provided in the present disclosure from a perspective of a base station.

FIG. 6 is a schematic diagram of an uplink data receiving method according to one embodiment of the present disclosure. The method 600 includes the following operations.

Operation S610. An access network device sends first scheduling information to a terminal device, where the first scheduling information is used to schedule the terminal device to transmit a first transport block by using an unlicensed carrier.

Operation S620. The access network device receives, from the terminal device, uplink data corresponding to the first transport block from a start time domain symbol, where the start time domain symbol is a first time domain symbol or a second time domain symbol in at least two time domain symbols included in a first time unit, the second time domain symbol is later than the first time domain symbol, and the at least two time domain symbols are used to receive the uplink data.

In the method 600, the access network device may be, for example, a base station, and the terminal device may be, for example, UE.

In S620, the base station may determine, based on a reference signal, the start time domain symbol, used by the UE to send the uplink data, in the at least two time domain symbols. For a specific method used by the base station to detect uplink data on each symbol, refer to the related prior art. For brevity, details are not described herein.

A person skilled in the art may clearly understand that in the method 600, the access network device and the terminal device are both equivalent to the access network device and the terminal device in the method 200, and actions of the access network device and the terminal device correspond to the actions of the access network device and the terminal device in the method 200. For brevity, details are not described herein again.

According to the uplink data sending method provided in the present disclosure, the access network device determines a time domain symbol, used to receive the uplink data, in at least two time domain symbols included in a subframe. When the uplink data is not detected in a previous time domain symbol, the access network device may detect whether the uplink data exists in a latter time domain symbol, thereby increasing a probability of successful transmission in a time unit and improving utilization of an unlicensed spectrum during uplink data transmission.

In some examples, that the access network device receives, from the terminal device, uplink data corresponding to the first transport block from a start time domain symbol includes the following operation.

Operation S621. The access network device determines the start time domain symbol as the first time domain symbol or the second time domain symbol based on a detected quantity or detected locations of reference signal symbols included in the first subframe.

In some examples, the access network device determines the start time domain symbol as the first time domain symbol or the second time domain symbol based on the detected quantity of the reference signal symbols included in the first subframe. For example, a reference signal is located on a symbol 3 and a symbol 10 in the first subframe. When detecting that a quantity of symbols used to send the reference signal in the first subframe is 2, the base station may determine the start time domain symbol as the first time domain symbol; or when detecting that a quantity of symbols used to send the reference signal in the first subframe is 1, the base station may determine the start time domain symbol as the second time domain symbol.

In some examples, the access network device determines the start time domain symbol as the first time domain symbol or the second time domain symbol based on the detected locations of the reference signal symbols included in the first subframe. For example, a reference signal is located on a symbol 3 and a symbol 10 in the first subframe. When detecting the reference signal on the symbol 3 in the first subframe, the base station may determine the start time domain symbol as the first time domain symbol; or when detecting no reference signal on the symbol 3 in the first subframe but detecting the reference signal on the symbol 10, the base station may determine the start time domain symbol as the second time domain symbol.

In some examples, the access network device determines the start time domain symbol as the first time domain symbol or the second time domain symbol based on the detected quantity and the detected locations of the reference signal symbols included in the first subframe. For example, a reference signal is located on a symbol 3 and a symbol 10 in the first subframe. When detecting that a quantity of symbols used to send the reference signal in the first subframe is 2, the base station may determine the start time domain symbol as the first time domain symbol; or when detecting that a quantity of symbols used to send the reference signal in the first subframe is 1 and the symbol used to send the reference signal is the symbol 10, the base station may determine the start time domain symbol as the second time domain symbol.

Operation S622. The access network device receives, based on the determined start time domain symbol, the uplink data corresponding to the first transport block from the terminal device.

According to the uplink data sending method provided in the present disclosure, the access network device determines a time domain symbol, used to receive the uplink data, in at least two time domain symbols included in a subframe. When the uplink data is not detected in a previous time domain symbol, the access network device may detect whether the uplink data exists in a latter time domain symbol, thereby increasing a probability of successful transmission in a time unit and improving utilization of an unlicensed spectrum during uplink data transmission.

In some examples, when the start time domain symbol is the first time domain symbol, the uplink data corresponding to the first transport block is first uplink data obtained by performing rate matching on the first transport block from the first time domain symbol; or when the start time domain symbol is the second time domain symbol, the uplink data corresponding to the first transport block is second uplink data obtained by performing rate matching on the first transport block from the second time domain symbol, where the second uplink data is remaining data in first uplink data after data between the first time domain symbol and the second time domain symbol is removed.

When the previous time domain symbol in the at least two time domain symbols cannot be used to transmit the uplink data and the latter time domain symbol can be used to transmit the uplink data, the terminal device may perform puncture transmission on data mapped on an entire subframe. To be specific, data before the latter time domain symbol is discarded and some data is transmitted only from the latter time domain symbol. Therefore, complexity of sending uplink data by the terminal device is reduced and load of a processor of the terminal device is alleviated.

In some examples, before the access network device receives, from the terminal device, the uplink data corresponding to the first transport block from the start time domain symbol, the method further includes the following operation.

Operation S630. The access network device sends first indication information to the terminal device, where the first indication information is used to indicate a first transmission mode or a second transmission mode, the first transmission mode is sending the uplink data corresponding to the first transport block from the first time domain symbol or the second time domain symbol, and the second transmission mode is sending the uplink data corresponding to the first transport block from the first time domain symbol and skipping sending the uplink data corresponding to the first transport block from the second time domain symbol.

The access network device may indicate a transmission mode of the terminal device, so that the transmission mode can be flexibly selected based on an actual situation.

In some examples, the first scheduling information is used to indicate a first modulation and coding scheme (MCS) index, and when the first indication information indicates the first transmission mode, a modulation order of the uplink data corresponding to the first transport block is a first modulation order determined based on the first MCS index and a first MCS configuration set; or when the first indication information indicates the second transmission mode, a modulation order of the uplink data corresponding to the first transport block is a first modulation order determined based on the first MCS index and a second MCS configuration set, where the first MCS configuration set is different from the second MCS configuration set.

When the start time domain symbol used to send the uplink data is different, a bit rate of the uplink data may also be different. In a subframe, a different MCS configuration set is selected based on a different transmission mode, so that a proper bit rate may be determined based on an actual situation, thereby improving flexibility and reliability of uplink data transmission.

In some examples, the first scheduling information is used to indicate a first MCS index, so that the terminal device determines, based on the first MCS index, a first modulation order, of the uplink data corresponding to the first transport block, in a first MCS configuration set.

In some examples, the method 600 further includes the following operation.

Operation S640. The access network device sends second scheduling information to the terminal device, where the second scheduling information is used to indicate a second MCS index, so that the terminal device determines, based on the second MCS index, a second modulation order, of uplink data corresponding to a second transport block, in a second MCS configuration set, the second transport block is transmitted by using a second subframe, and the first MCS configuration set is different from the second MCS configuration set.

A start time domain symbol used to send the uplink data in a different subframe may be different. Therefore, a bit rate at which the terminal device sends the uplink data by using the different subframe may also be different. A different MCS configuration set is selected for the different subframe, so that a proper bit rate may be determined based on an actual situation, thereby improving flexibility and reliability of uplink data transmission.

In some examples, that the first MCS configuration set is different from the second MCS configuration set includes:

a modulation order, corresponding to the first MCS index, in the first MCS configuration set is greater than or equal to a modulation order, corresponding to the first MCS index, in the second MCS configuration set.

For a same MCS index, a modulation order, corresponding to the MCS index, in the first MCS configuration set is greater than or equal to a modulation order, corresponding to the MCS index, in the second MCS configuration set. In the foregoing embodiment, when the uplink data is sent by using the first transmission mode or the first subframe, it is possible that the uplink data is sent from the second time domain symbol in the first subframe, and a larger modulation order in the first MCS configuration set may be used. Therefore, a bit rate may be reduced, and a probability of successful decoding of the access network device is increased.

In some examples, a first bit rate corresponding to a third modulation order in the first MCS configuration set is less than a preset value, the first bit rate is a bit rate of uplink data that is transmitted from the second time domain symbol, and the third modulation order is a modulation order other than a highest modulation order in the first MCS configuration set.

The preset value may be set based on a decoding capacity of the access network device and a current communication environment. When a bit rate of a transport block is greater than the preset value, a modulation order is increased and the bit rate is reduced, so that a probability of successful decoding of the access network device may be increased.

The foregoing describes an example of the uplink data sending method provided in the present disclosure in detail. It may be understood that, to implement the foregoing functions, the terminal device and the access network device include corresponding hardware structures and/or software modules for performing the functions. A person skilled in the art should easily be aware that, in combination with the examples described in the embodiments disclosed in this specification, units and algorithm operations can be implemented by hardware or a combination of hardware and computer software in the present disclosure. Whether a function is performed by hardware or computer software driving hardware depends on particular applications and design constraint conditions of the technical solutions. A person skilled in the art may use different methods to implement the described functions for each particular application, but it should not be considered that the implementation goes beyond the scope of the present disclosure.

In the present disclosure, the terminal device and the like may be divided into functional units based on the foregoing method examples. For example, each function unit may be obtained through division based on a corresponding function, or two or more functions may be integrated into one processing unit. The integrated unit may be implemented in a form of hardware, or may be implemented in a form of a software functional unit. It should be noted that, in the present disclosure, unit division is an example, and is merely logical function division. In actual implementation, another division manner may be used.

When an integrated unit is used, FIG. 7 is a possible schematic structural diagram of the terminal device in the foregoing embodiments. The terminal device 700 includes a processing unit 702 and a communications unit 703. The processing unit 702 is configured to control and manage actions of the terminal device 700. For example, the processing unit 702 is configured to support the terminal device 700 in performing S220 in FIG. 2 and/or other processes of the technologies described in this specification. The communications unit 703 is configured to support communication between the terminal device 700 and another network entity, for example, with an access network device. The terminal device 700 may further include a storage unit 701, configured to store program code and data of the terminal device 700.

The processing unit 702 may be a processor or a controller, for example, a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The processing unit 702 may implement or execute various example logical blocks, modules, and circuits described with reference to content disclosed in the present disclosure. Alternatively, the processor may be a combination for implementing a computing function, for example, a combination including one or more microprocessors, or a combination of a DSP and a microprocessor. The communications unit 703 may be a transceiver, a transceiver circuit, and the like. The storage unit 701 may be a memory.

Figure 8:
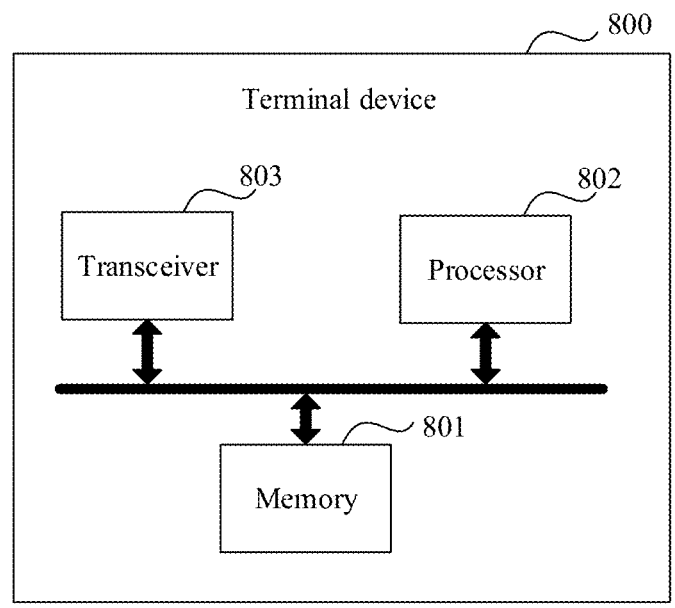
FIG. 8 is a schematic diagram of another possible terminal device according to one embodiment of the present disclosure.

When the processing unit 702 is a processor, the communications unit 703 is a transceiver, and the storage unit 701 is a memory, the terminal device in the present disclosure may be a terminal device shown in FIG. 8.

As shown in FIG. 8, the terminal device 800 includes a processor 802, a transceiver 803, and a memory 801. The transceiver 803, the processor 802, and the memory 801 may communicate with each other, and transmit a control and/or data signal by using an internal connection path.

It may be clearly understood by a person skilled in the art that, for the purpose of convenient and brief description, for a detailed working process of the foregoing apparatus and unit, refer to a corresponding process in the foregoing method embodiments, and details are not described herein again.

The terminal device 700 and the terminal device 800 provided in the present disclosure determine a time domain symbol, used to transmit uplink data, in at least two time domain symbols included in a subframe. When a previous time domain symbol in a time unit cannot be used, the terminal device may transmit the uplink data by using another available time domain symbol in the time unit, thereby increasing a probability of successful transmission in a time unit and improving utilization of an unlicensed spectrum during uplink data transmission.

Figure 9:
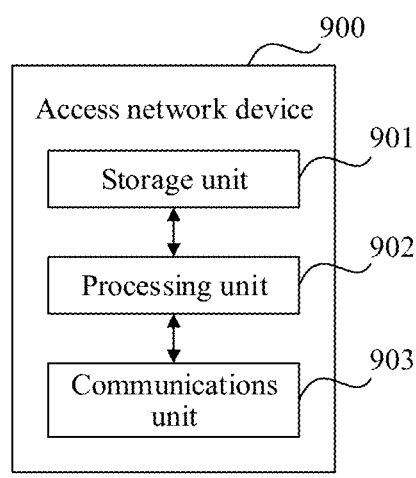
FIG. 9 is a schematic diagram of a possible access network device according to one embodiment of the present disclosure.

When an integrated unit is used, FIG. 9 is a possible schematic structural diagram of the access network device in the foregoing embodiments. The access network device 900 includes a processing unit 902 and a communications unit 903. The processing unit 902 is configured to control and manage actions of the access network device 900. For example, the processing unit 902 is configured to support the access network device 900 in performing S610 in FIG. 6 and/or other processes of the technologies described in this specification by using the communications unit 903. The communications unit 903 is configured to support communication between the access network device 900 and another network entity, for example, with a terminal device. The access network device 900 may further include a storage unit 901, configured to store program code and data of the access network device 900.

The processing unit 902 may be a processor or a controller, for example, a CPU, a general-purpose processor, a DSP, an ASIC, an FPGA, or another programmable logic device, a transistor logic device, a hardware component, or any combination thereof. The processing unit 902 may implement or execute various example logical blocks, modules, and circuits described with reference to content disclosed in the present disclosure. Alternatively, the processor may be a combination for implementing a computing function, for example, a combination including one or more microprocessors, or a combination of a DSP and a microprocessor. The communications unit 903 may be a transceiver, a transceiver circuit, and the like. The storage unit 901 may be a memory.

Figure 10:
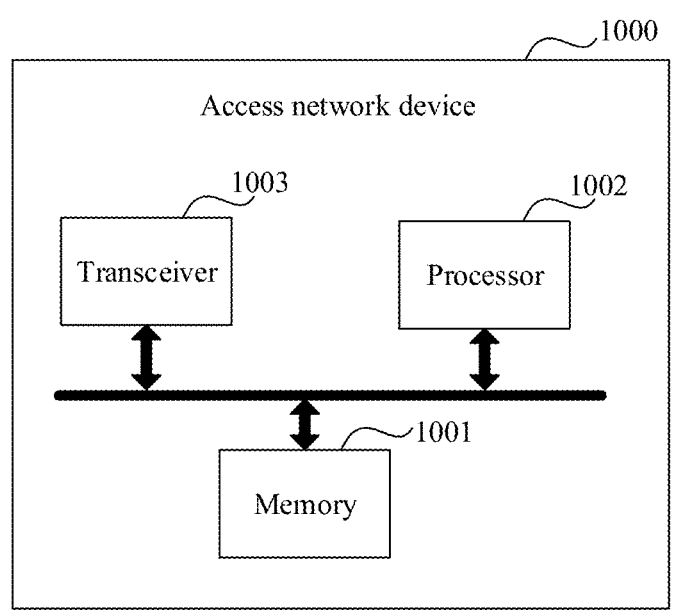
FIG. 10 is a schematic diagram of another possible access network device according to one embodiment of the present disclosure.

When the processing unit 902 is a processor, the communications unit 903 is a transceiver, and the storage unit 901 is a memory, the access network device in the present disclosure may be an access network device shown in FIG. 10.

Referring to FIG. 10, the access network device 1000 includes a processor 1002, a transceiver 1003, and a memory 1001. The transceiver 1003, the processor 1002, and the memory 1001 may communicate with each other, and transmit a control and/or data signal by using an internal connection path.

It may be clearly understood by a person skilled in the art that, for the purpose of convenient and brief description, for a detailed working process of the foregoing apparatus and unit, refer to a corresponding process in the foregoing method embodiments, and details are not described herein again.

The access network device 900 and the access network device 1000 for data transmission provided in the present disclosure determine a time domain symbol, used to receive uplink data, in at least two time domain symbols included in a subframe. When the uplink data is not detected in a previous time domain symbol, the access network device may detect whether the uplink data exists in a latter time domain symbol, thereby increasing a probability of successful transmission in a time unit and improving utilization of an unlicensed spectrum during uplink data transmission.

It should be understood that the foregoing transceiver may include a transmitter and a receiver. The transceiver may further include an antenna, and there may be one or more antennas. The memory may be a separate component, or may be integrated into the processor. The foregoing components or some components may be integrated into a chip for implementation, for example, integrated into a baseband chip for implementation.

Network devices or terminal devices in apparatus and method embodiments completely correspond to each other. A corresponding operation is performed by a corresponding module. For example, a sending module or a transmitter performs an operation of sending in the method embodiments, a receiving module or a receiver performs an operation of receiving in the method embodiments, and other operations other than operations of sending and receiving may be performed by a processing module or a processor. For a function of a specific module, refer to the corresponding method embodiment. Details are not described again.

An embodiment of the present disclosure further provides a communications chip, storing an instruction. When run on the terminal device 700 or the terminal device 800, the instruction enables the communications chip to perform the method corresponding to the terminal device in the foregoing implementations.

An embodiment of the present disclosure further provides a communications chip, storing an instruction. When run on the access network device 900 or the access network device 1000, the instruction enables the communications chip to perform the method corresponding to the access network device in the foregoing implementations.

It should be understood that sequence numbers of the foregoing processes do not mean execution sequences in the embodiments of the present disclosure. The execution sequences of the processes should be determined based on functions and internal logic of the processes, and should not be construed as any limitation on the implementation processes of the present disclosure.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Methods or algorithm operations described in combination with the content disclosed in the present disclosure may be implemented by hardware, or may be implemented by a processor executing a software instruction. The software instruction may include a corresponding software module. The software module may be stored in a random access memory (RAM), a flash memory, a read-only memory (ROM), an erasable programmable read-only memory (erasable programmable ROM, EPROM), an electrically erasable programmable read-only memory (electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a terminal device. Certainly, the processor and the storage medium may also exist in a terminal device and an access network device as discrete components.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to one embodiment of the present disclosure are all or partially generated. The computer may be a general-purpose computer, a dedicated computer, a computer network, or other programmable apparatuses. The computer instruction may be stored in a computer readable storage medium, or may be transmitted by using the computer readable storage medium. The computer instruction may be transmitted from a network site, a computer, a server, or a data center to another network site, computer, server, or data center in a wired (such as coaxial cable, fiber, and digital subscriber line (DSL)) manner or a wireless (such as infrared, ratio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement or improvement made based on the technical solutions of the present disclosure shall fall within the protection scope of the present disclosure.

What is claimed is:

1. A method of receiving uplink data, comprising:
   receiving, by a terminal device, scheduling information from an access network device, wherein the scheduling information schedules the terminal device to transmit a transport block by using an unlicensed carrier;
   performing, by the terminal device, a rate matching on the transport block to obtain uplink data;
   detecting, by the terminal device, the unlicensed carrier, and determining, based on a detection result, a start time domain symbol in a time unit on the unlicensed carrier, wherein the time unit includes a plurality of time domain symbols, including a first time domain symbol and a second time domain symbol, wherein the second time domain symbol is later than the first time domain symbol, and wherein the start time domain symbol is the first time domain symbol or the second time domain symbol, wherein the uplink data is mapped to the plurality of time domain symbols in the time unit; and
   discarding, by the terminal device, a first portion of the uplink data and information bits in the front of the transport block, the discarded first portion of the uplink data mapped to one or more time domain symbols of the plurality of time domain symbols before the start time domain symbol, and sending, by the terminal device, a second portion of the uplink data to the access network device using one or more time domain symbols of the plurality of time domain symbols starting from the start time domain symbol.

2. The method according to claim 1, wherein
   when the start time domain symbol is the first time domain symbol, the uplink data is first uplink data obtained by performing rate matching on the transport block starting from the first time domain symbol; or
   when the start time domain symbol is the second time domain symbol, the uplink data is second uplink data obtained by performing rate matching on the transport block starting from the second time domain symbol, wherein the second uplink data is remaining data in the first uplink data after data between the first time domain symbol and the second time domain symbol is removed.

3. The method according to claim 1, wherein before the performing, by the terminal device, the rate matching on the transport block, the method further comprises:
   receiving, by the terminal device, indication information from the access network device, wherein the indication information indicates a first transmission mode or a second transmission mode, wherein the first transmission mode is a mode in which the uplink data is transmitted in the time unit starting from the first time domain symbol or starting the second time domain symbol is received, and wherein the second transmission mode is a mode in which the uplink data is transmitted in the time unit starting from the first time domain symbol, and the uplink data starting from the second time domain symbol is skipped.

4. The method according to claim 3, wherein the performing, by the terminal device, the rate matching on the transport block comprises:
   determining, by the terminal device, a modulation order in a modulation and coding scheme (MCS) configuration set based on an MCS index; and
   performing, by the terminal device, rate matching on the transport block based on the modulation order, wherein when the indication information indicates the first transmission mode, the MCS configuration set is a first MCS configuration set; or when the indication information indicates the second transmission mode, the MCS configuration set is a second MCS configuration set, wherein the first MCS configuration set is different from the second MCS configuration set.

5. The method according to claim 1, wherein the performing, by the terminal device, rate matching on the transport block comprises:
   determining, by the terminal device, a modulation order in a modulation and coding schedule (MCS) configuration set based on an MCS index, and performing rate matching on the transport block based on the modulation order.

6. A method of receiving uplink data, comprising:
sending, by an access network device, scheduling information to a terminal device, wherein the scheduling information schedules the terminal device to transmit a transport block by using an unlicensed carrier;
receiving, by the access network device from the terminal device, a second portion of uplink data corresponding to the transport block transmitted in a time unit on the unlicensed carrier, wherein the time unit includes a plurality of time domain symbols, including a first time domain symbol and a second time domain symbol, wherein the second time domain symbol is later than the first time domain symbol, wherein the second portion of the uplink data is transmitted on the time unit using one or more time domain symbols of the plurality of time domain symbols starting from a start time domain symbol, wherein the start time domain symbol is the first time domain symbol or the second time domain symbol, wherein the uplink data is mapped to the plurality of time domain symbols in the time unit, and wherein a first portion of the uplink data and the front of the transport block are discarded, the discarded first portion of the uplink data mapped to the one or more time domain symbols of the plurality of time domain symbols before the start time domain symbol.

7. The method according to claim 6, wherein the receiving, by the access network device from the terminal device, the uplink data corresponding to the transport block transmitted in the time unit on the unlicensed carrier comprises:
determining, by the access network device, the start time domain symbol as the first time domain symbol or the second time domain symbol based on a detected quantity or detected locations of reference signal symbols comprised in the time unit; and
receiving, by the access network device based on the determined start time domain symbol, the uplink data corresponding to the transport block from the terminal device.

8. The method according to claim 6, wherein
when the start time domain symbol is the first time domain symbol, the uplink data corresponding to the transport block is first uplink data obtained by performing rate matching on the transport block starting from the first time domain symbol; or
when the start time domain symbol is the second time domain symbol, the uplink data corresponding to the transport block is second uplink data obtained by performing rate matching on the transport block starting from the second time domain symbol, wherein the second uplink data is remaining data in first uplink data after data between the first time domain symbol and the second time domain symbol is removed.

9. The method according to claim 6, wherein before the receiving, by the access network device from the terminal device, the uplink data corresponding to the transport block transmitted in the time unit on the unlicensed carrier, the method further comprises:
sending, by the access network device, indication information to the terminal device, wherein the indication information indicates a first transmission mode or a second transmission mode, wherein the first transmission mode is a mode in which the uplink data is transmitted in the time unit starting from the first time domain symbol or the second time domain symbol, and wherein the second transmission mode is a mode, in which the uplink data is transmitted in the time unit starting from the first time domain symbol and the uplink data starting from the second time domain symbol is skipped.

10. The method according to claim 9, wherein the scheduling information indicates a modulation and coding scheme (MCS) index, and
when the indication information indicates the first transmission mode, a modulation order of the uplink data is determined based on the MCS index and a first MCS configuration set; or
when the indication information indicates the second transmission mode, the modulation order of the uplink data is determined based on the MCS index and a second MCS configuration set, wherein the first MCS configuration set is different from the second MCS configuration set.

11. An apparatus for sending uplink data,
comprising a processing unit and a communications unit, wherein s the communications unit is configured to receive scheduling information from an access network device, wherein the scheduling information schedules the apparatus to transmit a transport block by using an unlicensed carrier;
the processing unit is configured to perform rate matching on the transport block to obtain uplink data;
the processing unit is further configured to detect the unlicensed carrier, and determine, based on a detection result, a start time domain symbol in a time unit on the unlicensed carrier, wherein the time unit includes a plurality of time domain symbols, including a first time domain symbol and a second time domain symbol, wherein the second time domain symbol is later than the first time domain symbol, and wherein the start time domain symbol is the first time domain symbol or the second time domain symbol; and
the communications unit is further configured to discard a first portion of the uplink data and information bits in the front of the transport block, the discarded first portion of the uplink data mapped to one or more time domain symbols of the plurality of time domain symbols before the start time domain symbol, and send a second portion of the uplink data to the access network device using one or more time domain symbols of the plurality of time domain symbols starting from the start time domain symbol.

12. The apparatus according to claim 11, wherein
when the start time domain symbol is the first time domain symbol, the uplink data is first uplink data obtained by performing rate matching on the transport block starting from the first time domain symbol; or
when the start time domain symbol is the second time domain symbol, the uplink data is second uplink data obtained by performing rate matching on the transport block starting from the second time domain symbol, wherein the second uplink data is remaining data in the first uplink data after data between the first time domain symbol and the second time domain symbol is removed.

13. The apparatus according to claim 11, wherein the communications unit is further configured to:
receive indication information from the access network device, wherein the indication information indicates a first transmission mode or a second transmission mode, wherein the first transmission mode is a mode in which the uplink data is transmitted in the time unit starting from the first time domain symbol or the second time domain symbol, and wherein the second transmission mode is a mode in which the uplink data is transmitted in the time unit starting from the first time domain symbol and the uplink data starting from the second time domain symbol is skipped.

14. The apparatus according to claim 13, wherein the processing unit is specifically configured to:
   determine a modulation order in a modulation and coding scheme (MCS) configuration set based on an MCS index; and
   perform rate matching on the transport block based on the modulation order; wherein
   when the indication information indicates the first transmission mode, the MCS configuration set is a first MCS configuration set; or when the indication information indicates the second transmission mode, the MCS configuration set is a second MCS configuration set, wherein the first MCS configuration set is different from the second MCS configuration set.

15. The apparatus according to claim 11, wherein the processing unit is configured to:
   determine a modulation order in a first modulation and coding schedule (MCS) configuration set based on an MCS index, and perform rate matching on the transport block based on the modulation order.

16. An apparatus of receiving uplink data, comprising a processing unit and a communications unit, wherein
   the processing unit is configured to send scheduling information to a terminal device by using the communications unit, wherein the scheduling information schedules the terminal device to transmit a transport block by using an unlicensed carrier; and
   the communications unit is configured to receive, from the terminal device, a second portion of uplink data corresponding to the transport block transmitted in a time unit on the unlicensed carrier, wherein the time unit includes a plurality of time domain symbols, including a first time domain symbol and a second time domain symbol, wherein the second time domain symbol is later than the first time domain symbol, wherein the second portion of the uplink data is transmitted on the time unit using one or more time domain symbols of the plurality of time domain symbols starting from a start time domain symbol, wherein the start time domain symbol is the first time domain symbol or the second time domain symbol, wherein the uplink data is mapped to the plurality of time domain symbols in the time unit, and wherein a first portion of the uplink data and information bits in the front of the transport block are discarded, the discarded first portion of the uplink data mapped to the one or more time domain symbols of the plurality of time domain symbols before the start time domain symbol.

17. The apparatus according to claim 16, wherein
   the processing unit is further configured to determine the start time domain symbol as the first time domain symbol or the second time domain symbol based on a detected quantity or detected locations of reference signal symbols comprised in the time unit; and
   the communications unit is further configured to receive, based on the determined start time domain symbol, the uplink data corresponding to the transport block from the terminal device.

18. The apparatus according to claim 16, wherein
   when the start time domain symbol is the first time domain symbol, the uplink data corresponding to the transport block is first uplink data obtained by performing rate matching on the transport block starting from the first time domain symbol; or
   when the start time domain symbol is the second time domain symbol, the uplink data corresponding to the transport block is second uplink data obtained by performing rate matching on the transport block starting from the second time domain symbol, wherein the second uplink data is remaining data in first uplink data after data between the first time domain symbol and the second time domain symbol is removed.

19. The apparatus according to claim 16, wherein the communications unit is further configured to:
   send indication information to the terminal device, wherein the indication information indicates a first transmission mode or a second transmission mode, the first transmission mode is a mode in which the uplink data is transmitted in the time unit starting from the first time domain symbol or the second time domain symbol, and wherein the second transmission mode is a mode in which the uplink data is transmitted in the time unit starting from the first time domain symbol and the uplink data starting from the second time domain symbol is skipped.

20. The apparatus according to claim 19, wherein the scheduling information indicates a modulation and coding scheme (MCS) index,
   when the indication information indicates the first transmission mode, a modulation order of the uplink data is determined based on the MCS index and a first MCS configuration set; or
   when the indication information indicates the second transmission mode, the modulation order of the uplink data is determined based on the MCS index and a second MCS configuration set, wherein the first MCS configuration set is different from the second MCS configuration set.

* * * * *